(12) United States Patent
Maamari et al.

(10) Patent No.: US 12,471,089 B2
(45) Date of Patent: Nov. 11, 2025

(54) ENHANCED SCHEDULING REQUEST CONFIGURATIONS FOR WIRELESS COMMUNICATIONS

(71) Applicant: QUALCOMM Incorporated, San Diego, CA (US)

(72) Inventors: Diana Maamari, San Diego, CA (US); Mickael Mondet, Louannec (FR); Ahmed Elshafie, San Diego, CA (US); Huilin Xu, Temecula, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/944,962

(22) Filed: Sep. 14, 2022

(65) Prior Publication Data

US 2024/0089968 A1 Mar. 14, 2024

(51) Int. Cl.
*H04W 72/20* (2023.01)
*H04W 72/23* (2023.01)

(52) U.S. Cl.
CPC ........... *H04W 72/20* (2023.01); *H04W 72/23* (2023.01)

(58) Field of Classification Search
None
See application file for complete search history.

(56) References Cited

U.S. PATENT DOCUMENTS

| 10,305,767 B2* | 5/2019 | Kollar | H04L 43/0852 |
| 11,160,105 B2* | 10/2021 | Lin | H04W 80/08 |
| 2014/0126399 A1* | 5/2014 | Damnjanovic | H04W 76/15 370/252 |

* cited by examiner

*Primary Examiner* — Hong S Cho
(74) *Attorney, Agent, or Firm* — Holland & Hart LLP/Qualcomm Incorporated

(57) ABSTRACT

Methods, systems, and devices for wireless communications are described. Some wireless communications systems may support enhanced scheduling request configurations. A user equipment (UE) may obtain, at a packet data convergence protocol (PDCP) layer of the UE, information associated with a data packet for transmission by the UE. The UE may transmit a scheduling request that indicates information regarding an elapsed time period since the information associated with the data packet was obtained at the PDCP layer of the UE, or whether the data packet is a final packet of a set of data packets, or both. A network entity may receive the scheduling request and determine scheduling information for uplink communications by the UE based on the information regarding the elapsed time period, or whether the data packet is the final data packet, or both. The network entity may transmit the scheduling information to the UE.

30 Claims, 20 Drawing Sheets

ENHANCED SCHEDULING REQUEST CONFIGURATIONS FOR WIRELESS COMMUNICATIONS

FIELD OF TECHNOLOGY

The following relates to wireless communication, including enhanced scheduling request configurations for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may transmit a scheduling request to indicate that the UE has uplink data to transmit and to request an uplink grant. The UE may subsequently transmit a buffer status report (BSR) that indicates information about an amount of data for transmission at the UE. A network entity may receive allocate resources for an uplink transmission by the UE based on the scheduling request and the BSR.

SUMMARY

The described techniques relate to improved methods, systems, devices, and apparatuses that support enhanced scheduling request configurations for wireless communications. For example, the described techniques provide for a user equipment (UE) to transmit a scheduling request to indicate that the UE has uplink data to transmit along with additional information associated with uplink communications by the UE. The UE may obtain, at a packet data convergence protocol (PDCP) layer of the UE, information associated with a data packet for transmission by the UE. The information may include an arrival time of the data packet, an amount of data at the PDCP layer of the UE, an index or position of the data packet from among a set of data packets associated with a burst transmission, or any combination thereof. The UE may transmit a scheduling request that requests an uplink grant and indicates additional information based on the UE obtaining the information associated with the data packet at the PDCP layer of the UE. For example, the scheduling request may indicate information regarding an elapsed time period since the information associated with the data packet was obtained at the PDCP layer of the UE, or whether the data packet is a final packet of a set of data packets, or both. A network entity may receive the scheduling request and determine scheduling information for uplink communications by the UE based on the information regarding the elapsed time period, or whether the data packet is the final data packet, or both. The network entity may transmit the scheduling information to the UE. The scheduling information may include, for example, an uplink grant for the UE and a corresponding set of resources allocated for uplink transmission by the UE, a command for the UE to enter a power savings mode, an activation or deactivation of one or more scheduling request configurations, or any combination thereof.

In some aspects, the network entity may configure multiple scheduling request configurations each associated with a respective logical channel and a respective set of timing parameters for scheduling request transmission. Different sets of scheduling request configurations may be dynamically activated and deactivated based on a transmission pattern of uplink data by the UE. For example, a first set of scheduling request configurations may be activated during a burst transmission by the UE and a second set of scheduling request configurations may be activated after the UE completes the burst transmission. The first set may be associated with more frequent scheduling request transmissions than the second set. The network entity may transmit control signaling to dynamically activate or deactivate the sets, or the sets may be activated and deactivated based on a configured timer, based on an indication that a burst transmission is ending, or both.

A method for wireless communication at a UE is described. The method may include transmitting a scheduling request that indicates information regarding an elapsed time period since information associated with a data packet was obtained at a PDCP layer of the UE, or whether the data packet includes a final packet of a set of data packets, or both and receiving scheduling information for communications by the UE, the scheduling information based on the elapsed time period, or whether the data packet includes the final packet of the set of data packets, or both.

An apparatus for wireless communication is described. The apparatus may include memory, a transceiver, and at least one processor of a UE, the at least one processor coupled with the memory and the transceiver. The at least one processor may be configured to transmit a scheduling request that indicates information regarding an elapsed time period since information associated with a data packet was obtained at a PDCP layer of the UE, or whether the data packet includes a final packet of a set of data packets, or both and receive scheduling information for communications by the UE, the scheduling information based on the elapsed time period, or whether the data packet includes the final packet of the set of data packets, or both.

Another apparatus for wireless communication at a UE is described. The apparatus may include means for transmitting a scheduling request that indicates information regarding an elapsed time period since information associated with a data packet was obtained at a PDCP layer of the UE, or whether the data packet includes a final packet of a set of data packets, or both and means for receiving scheduling information for communications by the UE, the scheduling information based on the elapsed time period, or whether the data packet includes the final packet of the set of data packets, or both.

A non-transitory computer-readable medium storing code for wireless communication at a UE is described. The code may include instructions executable by a processor to transmit a scheduling request that indicates information regarding an elapsed time period since information associated with a data packet was obtained at a PDCP layer of the UE, or whether the data packet includes a final packet of a set of data packets, or both and receive scheduling information for communications by the UE, the scheduling information based on the elapsed time period, or whether the data packet includes the final packet of the set of data packets, or both.

In some examples of the method, apparatuses, and non-transitory computer-readable medium described herein, transmitting the scheduling request may include operations, features, means, or instructions for transmitting, within the scheduling request, a bit that indicates a request for an uplink grant and whether the elapsed time period is greater than a threshold time period, where the bit having a first value indicates that the elapsed time period is greater than the threshold time period and the bit having a second value indicates that the elapsed time period is less than the threshold time period.

In some examples of the method, apparatuses, and non-transitory computer-readable medium described herein, the bit may have the first value, and receiving the scheduling information may include operations, features, means, or instructions for receiving the uplink grant, where a timing associated with the uplink grant may be based on the bit of the scheduling request having the first value.

In some examples of the method, apparatuses, and non-transitory computer-readable medium described herein, the bit may have the second value and the method, apparatuses, and non-transitory computer-readable medium may include further operations, features, means, or instructions for transmitting a buffer status report (BSR) after transmitting the scheduling request based on the elapsed time period being less than the threshold time period, where receiving the scheduling information includes and receiving the uplink grant in response to the BSR, where receiving the scheduling information after transmitting the BSR may be based on the bit of the scheduling request having the second value.

Some examples of the method, apparatuses, and non-transitory computer-readable medium described herein may further include operations, features, means, or instructions for receiving control signaling that indicates a set of multiple scheduling request configurations each associated with a respective logical channel and selecting, based on the elapsed time period and a threshold time period, a scheduling request configuration from the set of multiple scheduling request configurations for transmitting the scheduling request, where a first scheduling request configuration of the set of multiple scheduling request configurations may be for indicating that the elapsed time period may be less than the threshold time period and a second scheduling request configuration of the set of multiple scheduling request configurations may be for indicating that the elapsed time period may be greater than or equal to the threshold time period.

Some examples of the method, apparatuses, and non-transitory computer-readable medium described herein may further include operations, features, means, or instructions for generating the scheduling request to indicate the information regarding the elapsed time period based on a quality of service associated with a logical channel corresponding to the data packet.

Some examples of the method, apparatuses, and non-transitory computer-readable medium described herein may further include operations, features, means, or instructions for determining that the elapsed time period may be a longest time period of a set of multiple elapsed time periods associated with a set of multiple data packets for transmission by the UE and selecting the data packet from among the set of multiple data packets based on the elapsed time period being the longest time period, where the scheduling request indicates the information regarding the elapsed time period for the data packet based on the data packet being selected from among the set of multiple data packets.

In some examples of the method, apparatuses, and non-transitory computer-readable medium described herein, the scheduling request includes two or more bits configured to indicate the information regarding the elapsed time period, information regarding a portion of a packet delay budget that may be remaining for the data packet after the elapsed time period, or both.

Some examples of the method, apparatuses, and non-transitory computer-readable medium described herein may further include operations, features, means, or instructions for transmitting, via the two or more bits of the scheduling request, an index value that points to a value or range of the elapsed time period from among a set of elapsed time period values or ranges.

In some examples of the method, apparatuses, and non-transitory computer-readable medium described herein, transmitting the scheduling request may include operations, features, means, or instructions for transmitting, within the scheduling request, a bit that indicates a request for an uplink grant and whether the data packet includes the final packet of the set of data packets, where the bit having a first value indicates that the data packet includes the final packet of the set of data packets and the bit having a second value indicates that the data packet may be not the final packet of the set of data packets.

In some examples of the method, apparatuses, and non-transitory computer-readable medium described herein, receiving the scheduling information may include operations, features, means, or instructions for receiving, via the scheduling information, a connected discontinuous reception (CDRX) command based on the scheduling request indicating that the data packet includes the final packet of the set of data packets and entering a sleep mode based on the CDRX command.

Some examples of the method, apparatuses, and non-transitory computer-readable medium described herein may further include operations, features, means, or instructions for receiving radio resource control (RRC) signaling that configures the scheduling request to indicate the information regarding the elapsed time period, or to indicate whether the data packet includes the final packet of the set of data packets, or both, where content of the scheduling request may be based on the RRC signaling.

Some examples of the method, apparatuses, and non-transitory computer-readable medium described herein may further include operations, features, means, or instructions for receiving control signaling that configures a set of multiple sets of scheduling request configurations, where each set of scheduling request configurations of the set of multiple sets may be associated with a respective logical channel and one or more respective scheduling request timing parameters.

Some examples of the method, apparatuses, and non-transitory computer-readable medium described herein may further include operations, features, means, or instructions for receiving second control signaling that activates a first set of scheduling request configurations from among the set of multiple sets of scheduling request configurations for a time period associated with a burst transmission by the UE, where the set of data packets includes a first burst transmission and receiving third control signaling that activates a second set of scheduling request configurations from among the set of multiple sets of scheduling request configurations for a second time period between burst transmissions by the UE.

In some examples of the method, apparatuses, and non-transitory computer-readable medium described herein, the scheduling request may be transmitted in accordance with a first set of scheduling request configurations from among the set of multiple sets of scheduling request configurations, the set of data packets may include an uplink burst transmission by the UE, the data packet may include the final packet of the uplink burst transmission, and the method, apparatuses, and non-transitory computer-readable medium may include further operations, features, means, or instructions for transmitting, after transmitting the scheduling request and based on the data packet including the final packet of the uplink burst transmission, a second scheduling request in accordance with a second set of scheduling request configurations from among the set of multiple sets of scheduling request configurations.

In some examples of the method, apparatuses, and non-transitory computer-readable medium described herein, each scheduling request configuration of the set of multiple sets of scheduling request configurations may be associated with a respective buffer status report periodicity, a respective sounding reference signal configuration, a respective channel state information reporting configuration, or any combination thereof.

Some examples of the method, apparatuses, and non-transitory computer-readable medium described herein may further include operations, features, means, or instructions for transmitting assistance information that indicates a preferred set of scheduling request configurations, or a time period associated with the preferred set of scheduling request configurations, or both, where receiving the control signaling may be based on the assistance information.

A method for wireless communication at a network entity is described. The method may include receiving a scheduling request that indicates information regarding an elapsed time period between information associated with a data packet being obtained at a PDCP layer of a UE and the scheduling request, or whether the data packet includes a final packet of a set of data packets, or both, determining scheduling information for uplink communications by the UE based on the elapsed time period, or whether the data packet includes the final packet of the set of data packets, or both, and transmitting the scheduling information for the uplink communications by the UE.

An apparatus for wireless communication is described. The apparatus may include memory, a transceiver, and at least one processor of a network entity, the at least one processor coupled with the memory and the transceiver. The at least one processor may be configured to receive a scheduling request that indicates information regarding an elapsed time period between information associated with a data packet being obtained at a PDCP layer of a UE and the scheduling request, or whether the data packet includes a final packet of a set of data packets, or both, determine scheduling information for uplink communications by the UE based on the elapsed time period, or whether the data packet includes the final packet of the set of data packets, or both, and transmit the scheduling information for the uplink communications by the UE.

Another apparatus for wireless communication at a network entity is described. The apparatus may include means for receiving a scheduling request that indicates information regarding an elapsed time period between information associated with a data packet being obtained at a PDCP layer of a UE and the scheduling request, or whether the data packet includes a final packet of a set of data packets, or both, means for determining scheduling information for uplink communications by the UE based on the elapsed time period, or whether the data packet includes the final packet of the set of data packets, or both, and means for transmitting the scheduling information for the uplink communications by the UE.

A non-transitory computer-readable medium storing code for wireless communication at a network entity is described. The code may include instructions executable by a processor to receive a scheduling request that indicates information regarding an elapsed time period between information associated with a data packet being obtained at a PDCP layer of a UE and the scheduling request, or whether the data packet includes a final packet of a set of data packets, or both, determine scheduling information for uplink communications by the UE based on the elapsed time period, or whether the data packet includes the final packet of the set of data packets, or both, and transmit the scheduling information for the uplink communications by the UE.

In some examples of the method, apparatuses, and non-transitory computer-readable medium described herein, receiving the scheduling request may include operations, features, means, or instructions for receiving, within the scheduling request, a bit that indicates a request for an uplink grant and whether the elapsed time period may be greater than a threshold time period, where the bit having a first value indicates that the elapsed time period may be greater than the threshold time period and the bit having a second value indicates that the elapsed time period may be less than the threshold time period.

In some examples of the method, apparatuses, and non-transitory computer-readable medium described herein, the bit may have the first value, and transmitting the scheduling information may include operations, features, means, or instructions for transmitting the uplink grant for the UE, where a timing associated with the uplink grant may be based on the bit of the scheduling request having the first value.

In some examples of the method, apparatuses, and non-transitory computer-readable medium described herein, the bit may have the second value and the method, apparatuses, and non-transitory computer-readable medium may include further operations, features, means, or instructions for receiving a buffer status report after receiving the scheduling request based on the elapsed time period being less than the threshold time period, where determining the scheduling information may be based on the bit having the second value and the buffer status report, and where transmitting the scheduling information includes and transmitting the uplink grant for the UE, where a timing associated with the uplink grant may be based on the bit of the scheduling request having the second value.

Some examples of the method, apparatuses, and non-transitory computer-readable medium described herein may further include operations, features, means, or instructions for transmitting control signaling that indicates a set of multiple scheduling request configurations each associated with a respective logical channel, where a first scheduling request configuration of the set of multiple scheduling request configurations may be for indicating that the elapsed time period may be less than a threshold time period and a second scheduling request configuration of the set of multiple scheduling request configurations may be for indicating that the elapsed time period may be greater than or equal to the threshold time period, and where the scheduling request may be in accordance with one of the first scheduling request configuration or the second scheduling request configuration.

In some examples of the method, apparatuses, and non-transitory computer-readable medium described herein, receiving the scheduling request may include operations, features, means, or instructions for receiving, via the scheduling request, an index value that points to a value or range of the elapsed time period from among a set of elapsed time period values or ranges, where the scheduling request includes two or more bits for indicating the index value.

In some examples of the method, apparatuses, and non-transitory computer-readable medium described herein, receiving the scheduling request may include operations, features, means, or instructions for receiving, within the scheduling request, a bit that indicates a request for an uplink grant and whether the data packet includes the final packet of the set of data packets, where the bit having a first value indicates that the data packet includes the final packet of the set of data packets and the bit having a second value indicates that the data packet may be not the final packet of the set of data packets.

In some examples of the method, apparatuses, and non-transitory computer-readable medium described herein, transmitting the scheduling information may include operations, features, means, or instructions for transmitting a CDRX command based on the scheduling request indicating that the data packet includes the final packet of the set of data packets, where the CDRX command instructs the UE to enter a sleep mode.

Some examples of the method, apparatuses, and non-transitory computer-readable medium described herein may further include operations, features, means, or instructions for transmitting RRC signaling that configures the scheduling request to indicate the information regarding the elapsed time period, or to indicate whether the data packet includes the final packet of the set of data packets, or both, where content of the scheduling request may be based on the RRC signaling.

Some examples of the method, apparatuses, and non-transitory computer-readable medium described herein may further include operations, features, means, or instructions for transmitting first control signaling that configures a set of multiple sets of scheduling request configurations, where each set of scheduling request configurations of the set of multiple sets may be associated with a respective logical channel and one or more respective scheduling request timing parameters, transmitting second control signaling that activates a first set of scheduling request configurations from among the set of multiple sets of scheduling request configurations for a time period associated with a burst transmission by the UE, where the set of data packets includes a first burst transmission, and transmitting third control signaling that activates a second set of scheduling request configurations from among the set of multiple sets of scheduling request configurations for a second time period between burst transmissions by the UE.

Some examples of the method, apparatuses, and non-transitory computer-readable medium described herein may further include operations, features, means, or instructions for receiving assistance information that indicates a preferred set of scheduling request configurations, or a time period associated with the preferred set of scheduling request configurations, or both, where transmitting the first control signaling may be based on the assistance information.

DETAILED DESCRIPTION

Figure 1:
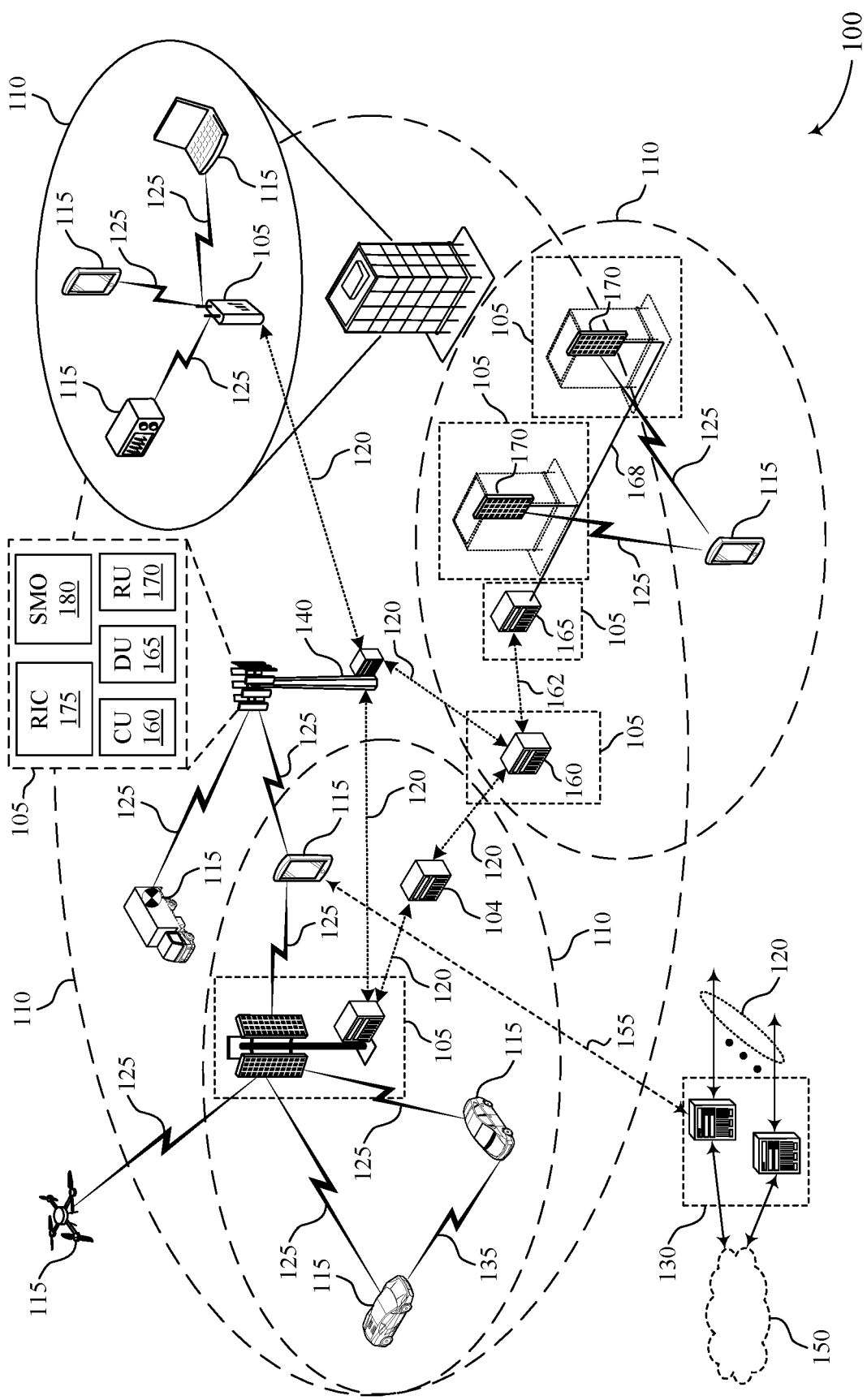
FIG. 1 illustrates an example of a wireless communications system that supports enhanced scheduling request configurations for wireless communications in accordance with one or more aspects of the present disclosure.

In some wireless communications systems, communications between a user equipment (UE) and a network entity may support one or more relatively low-latency applications (e.g., extended reality (XR) applications, or other types of applications). Uplink data for such applications may be transmitted in relatively frequency bursts of data with relatively short round-trip-times (RTT). An RTT may correspond to a time period over which data is transferred from the UE, to the network entity, to a user plane function (UPF) of the network, and back to the UE via the network entity. Uplink transmissions by the UE may be scheduled by the network entity. The UE may transmit a scheduling request to request an uplink grant from the network entity. In some cases, the UE may transmit the scheduling request in a first uplink slot and a buffer status report (BSR) in a subsequent uplink slot. The BSR may indicate an amount of data for transmission by the UE, and the network entity may transmit an uplink grant in response to the BSR. If more downlink slots are allocated than uplink slots, the scheduling request and the BSR may be transmitted via separate non-contiguous uplink slots, which may increase latency. In some aspects, there may be a delay between arrival of a packet at a packet data convergence protocol (PDCP) layer of the UE and transmission of the scheduling request, the packet, or both. The network entity may not account for such a delay at the UE when making scheduling decisions, which may result in transmissions by the UE exceeding a packet delay budget (PDB) for a given application.

Techniques, systems, and devices described herein provide for a UE to indicate, as part of a scheduling request, information associated with a data packet at a PDCP layer of the UE to improve scheduling decisions by the network entity, reduce latency, and improve throughput of wireless communications, among other advantages. The information may include an elapsed time period since the data packet arrived at the PDCP layer of the UE, whether the data packet is a final data packet of a set of data packets (e.g., an end of a transmission burst), or both. In some aspects, the scheduling request may be configured to indicate whether the elapsed time period of the data packet at the UE is greater than or less than a threshold time period. For example, a first value of a bit in the scheduling request may indicate that the time period is greater than the threshold time period and a second value of the bit in the scheduling request may indicate that the time period is less than the threshold time period. The network entity may transmit control signaling to indicate the threshold time period to the UE. Additionally, or alternatively, the scheduling request may include multiple bits configured to indicate a value of the elapsed time period or an index value that points to a value or range of the elapsed time period from among a set of elapsed time period values or ranges (e.g., a table). The network entity may prioritize resource allocation for uplink transmission by the UE when the scheduling request indicates the elapsed time period is greater than the threshold time period. For example, the network entity may transmit an uplink grant sooner for a data packet associated with a longer elapsed time period than for a data packet associated with a shorter elapsed time period, such that a packet delay budget for the data packets may be satisfied.

In some other aspects, the UE may indicate, via a scheduling request, an end of a burst transmission by the UE. For example, the UE may transmit the scheduling request to request an uplink grant, a first value of the scheduling request may indicate the end of a burst transmission, and a second value of the scheduling request may indicate that a current packet is not the final packet of a burst transmission. In some aspects, the UE may be triggered to transmit the scheduling request based on the arrival of a final packet of a burst transmission at the PDCP layer of the UE. The network entity may schedule uplink transmissions by the UE or instruct the UE to enter a sleep mode based on the end of burst indication, which may reduce power consumption by the UE.

The network entity may configure multiple sets of scheduling request configurations for the UE. Each scheduling request configuration may be associated with a respective logical channel and a respective set of timing parameters. The timing parameters may include, for example, a BSR periodicity, a sounding reference signal (SRS) configuration, a channel state information (CSI) reporting configuration, or any combination thereof. The network entity may transmit control signaling to dynamically activate or deactivate the sets of scheduling request configurations based on a periodicity of burst transmissions by the UE. For example, the network entity may activate, during a burst transmission by the UE, a first set of scheduling request configurations with timing parameters that support relatively frequency transmission by the UE. Additionally, or alternatively, the UE may be configured to activate or deactivate sets of scheduling request configurations based on whether an end of burst indication is transmitted via a scheduling request. For example, if the UE transmits a scheduling request to indicate that a current transmission burst is ending, the UE may additionally deactivate the first set of scheduling request configurations and activate a second set of scheduling request configurations, which may improve resource utilization by allocating fewer resources for scheduling request transmission when the UE is not transmitting a burst (e.g., in a sleep mode).

Aspects of the disclosure are initially described in the context of wireless communications systems. Additional aspects of the disclosure are described with reference to process flows, communication timelines, and scheduling request configuration timelines. Aspects of the disclosure are further illustrated by and described with reference to apparatus diagrams, system diagrams, and flowcharts that relate to enhanced scheduling request configurations for wireless communications.

FIG. 1 illustrates an example of a wireless communications system 100 that supports enhanced scheduling request configurations for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhanced scheduling request configurations for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques, systems, and devices described herein provide for a UE 115 within the wireless communications system 100 to transmit a scheduling request to indicate that the UE 115 has uplink data to transmit and additional information associated with uplink communications by the UE 115. The UE 115 may obtain, at a PDCP layer of the UE 115, information associated with a data packet for transmission by the UE 115. The information may include an arrival time of the data packet, an amount of data at the PDCP layer of the UE 115, an index or position of the data packet from among a set of data packets associated with a burst transmission, or any combination thereof. The UE 115 may transmit a scheduling request that requests an uplink grant and indicates additional information based on the UE 115 obtaining the information associated with the data packet at the PDCP layer of the UE 115. For example, the scheduling request may indicate information regarding an elapsed time period since the information associated with the data packet was obtained at the PDCP layer of the UE 115, or whether the data packet is a final packet of a set of data packets, or both. A network entity 105 may receive the scheduling request and determine scheduling information for uplink communications by the UE 115 based on the information regarding the elapsed time period, or whether the data packet is the final data packet, or both. The network entity 105 may transmit the scheduling information to the UE 115. The scheduling information may include, for example, an uplink grant for the UE 115 and a corresponding set of resources allocated for uplink transmission by the UE 115, a command for the UE 115 to enter a power savings mode, an activation or deactivation of one or more scheduling request configurations, or any combination thereof.

In some aspects, the network entity 105 may configure multiple scheduling request configurations each associated with a respective logical channel and a respective set of timing parameters for scheduling request transmission. Different sets of scheduling request configurations may be dynamically activated and deactivated based on a transmission pattern of uplink data by the UE 115. For example, a first set of scheduling request configurations may be activated during a burst transmission by the UE 115 and a second set of scheduling request configurations may be activated after the UE 115 completes the burst transmission. The first set may be associated with more frequent scheduling request transmissions than the second set. The network entity 105 may transmit control signaling to dynamically activate or deactivate the sets, or the sets may be activated and deactivated based on a configured timer, based on an indication that a burst transmission is ending, or both.

Figure 2:
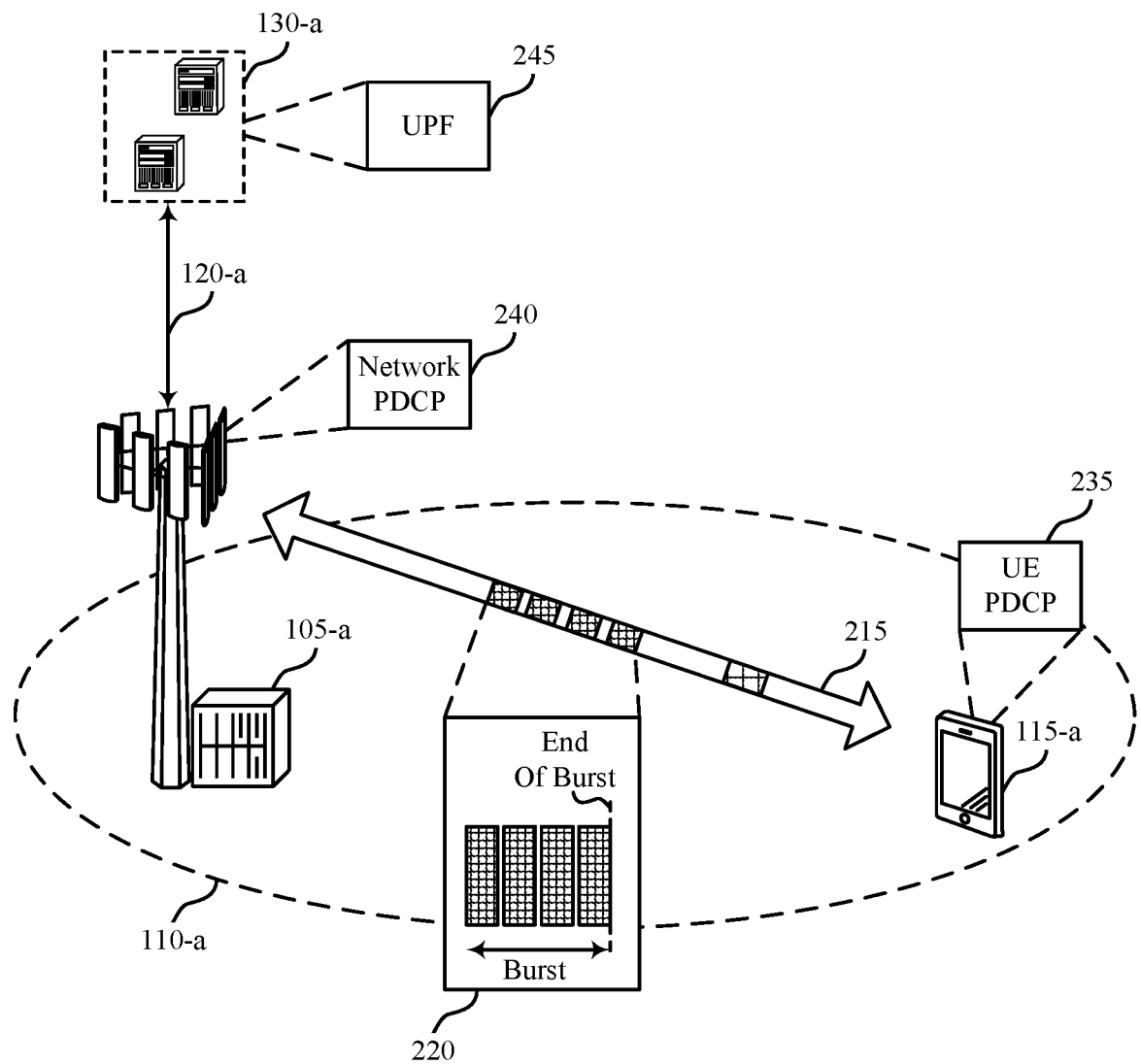
FIG. 2 illustrates an example of a wireless communications system that supports enhanced scheduling request configurations for wireless communications in accordance with one or more aspects of the present disclosure.

FIG. 2 illustrates an example of a wireless communications system 200 that supports enhanced scheduling request configurations for wireless communications in accordance with one or more aspects of the present disclosure. The wireless communications system 200 may implement or be implemented by aspects of the wireless communications system 100 as described with reference to FIG. 1. For example, the wireless communications system 200 may include a network entity 105-a and a UE 115-a, which may represent examples of a network entity 105 and a UE 115 as described with reference to FIG. 1. The network entity 105-a may communicate with the UE 115-a within a geographic coverage area 110-a and via a communication link 215. The network entity 105-a may communicate with a core network 130-a via a backhaul communication link 120-a, which may represent examples of a core network 130 and a backhaul communication link 120 described with reference to FIG. 1. The network entity 105-a and the UE 115-a may exchange one or more uplink and downlink data packets 225 via the communication link 215 (e.g., a Uu link). In this example, the UE 115-a may transmit, via one or more scheduling requests 230, information associated with the data packets 225.

The network entity 105-a and the UE 115-a may, in some examples, support one or more applications (e.g., cloud gaming applications, XR applications, virtual reality (VR) split rendering applications, augmented reality (AR) split computation applications, some other applications, or any combination thereof) that may be associated with relatively frequent uplink data traffic, downlink data traffic, or both. The data traffic for the one or more applications may be associated with relatively frequent changes (e.g., low latency). In some aspects, the UE 115-a may share computational or rendering processes with an edge server (e.g., an edge cloud), which may result in frequent uplink and downlink transmissions with relatively small data packet sizes. In some aspects, the UE 115-a may be a wearable device (e.g., an XR headset). Additionally, or alternatively, the UE 115-a may represent an example of or be in communication with an application client or a client device (e.g., a gaming device or controller) via an application programming interface (API). In some aspects, the application client may be software or a logical entity that is executed by the UE 115-a.

The uplink data traffic for such applications may include controller traffic, or some other type of traffic which may be used by the application server for downlink traffic generation. Accordingly, the experience of a user associated with the UE 115-a may be determined by a round-trip time (RTT) between the uplink data packets 225 being transmitted by the UE 115-a and the downlink data packets 225 being received at the UE 115-a. A relatively low RTT (e.g., RTT less than 20 ms, or some other threshold RTT) may be beneficial to support relatively low latency applications. The RTT may be based on an uplink packet delay and a downlink packet delay. The uplink packet delay may correspond to a delay or time period over which the data packet 225 is transferred between a PDCP layer 235 of the UE 115-a, a PDCP layer 240 of the network entity 105-a, and a UPF 245 of the core network 130. The downlink packet delay may correspond to a delay or time period over which the data packet 225 is transferred between the UPF 245, the PDCP layer 240 of the network entity 105-a, and the PDCP layer 235 of the UE 115-a, as illustrated in FIG. 2.

The uplink packet delay may be based on a first delay on the air interface from the PDCP layer 235 of the UE 115-a to the PDCP layer 240 of the network entity 105-a (e.g., via the communication link 215) and a second delay on the network interfaces from the network entity 105-a to the UPF 245 of the core network 130-a (e.g., one or more backhaul communication links 120). The first delay may include a delay associated with a waiting time of an uplink data packet 225 at the PDCP layer 235 of the UE 115-a (e.g., Twait). The waiting time may correspond to an elapsed time period between a first time at which the uplink data packet 225 arrives at the PDCP layer 235 of the UE 115-a and a second time which is a current time or a time at which the uplink data packet 225 is transmitted by the UE 115-a. The timing delays associated with an uplink data packet 225 are described in further detail elsewhere herein, including with reference to FIGS. 3 and 4.

If one or more uplink data packets 225 arrive at the PDCP layer 235 of the UE 115-a for transmission, the UE 115-a may transmit a scheduling request 230 that indicates a request for an uplink grant. In some aspects, the UE 115-a may subsequently transmit a BSR that indicates an amount of the uplink data for transmission by the UE 115-a (e.g., a quantity of bits associated with the one or more uplink data packets 225). The network entity 105-a may transmit an uplink grant to the UE 115-a to allocate uplink resources for transmission of the data packet 225 based on the scheduling request 230 and the BSR. The transmission of the BSR may, in some aspects, increase a length of the uplink packet delay. For example, some slot structures (e.g., a DDDSU structure) may allocate more slots for downlink transmissions than uplink transmissions. The UE 115-a may wait for a first available uplink slot to transmit the scheduling request 230, and the UE 115-a may wait for a second, subsequent available uplink slot to transmit the BSR. The UE 115-a may wait for a third available uplink slot to be scheduled for the uplink transmission based on the BSR. The three uplink slots may be spaced apart, in some cases, due to the slot structure. In such cases, the delay may be relatively large (e.g., 10 ms at 15 kHz subcarrier spacing (SCS)). Additionally, in some cases, additional delays may be incurred (e.g., a 2.5 ms delay at 15 kHz SCS and a 1.25 ms delay at 30 kHz SCS) due to an average time between generation of a positive scheduling request 230 at the UE 115-a and the opportunity and duration of a corresponding physical uplink control channel (PUCCH) transmission opportunity. Such delays may affect throughput and reliability of communications for some relatively low latency applications with relatively tight delay budgets, such as XR.

In some cases, the network entity 105-a may not be capable of computing the uplink packet delay for a given data packet 225 because the network entity 105-a may not know the elapsed time associated with the data packet 225 at the PDCP layer of the UE 115-a (e.g., Twait). In such cases, the network entity 105-a may schedule uplink transmissions by the UE 115-a that may cause an uplink data packet 225 to miss a PDB. The PDB may be a characteristic of a quality of service (QoS) flow associated with communications between the UE 115-a and the network entity 105-a and may correspond to a time period (e.g., an upper bound or a maximum period) for transmission and reception of a data packet 225. The network entity 105-a may be provided with a 5G QoS Identifier (5QI) for the QoS flows (e.g., during a packet data unit (PDU) session resource setup or modification procedure) that indicates the PDB for the QoS flows. If the network entity 105-a is aware of the elapsed time period or the delay associated with the uplink data packet 225 at the UE 115-a, the network entity 105-a may be able to precisely calculate the uplink packet delay, which may provide for the network entity 105-a to schedule uplink transmissions by the UE 115-a that meet or satisfy the PDB.

Techniques, systems, and devices described herein provide for the UE 115-a to indicate a time period associated with a delay at the UE 115-a (e.g., Twait) to the network entity 105-a. The UE 115-a may, for example, transmit a scheduling request 230 that indicates the time period. The time period may be an elapsed time period since an uplink data packet 225 (e.g., a service data unit (SDU)) arrived at a PDCP layer of the UE 115-a. The uplink data packet 225 may be stored as a PDU in a PDCP queue or buffer of the UE 115-a during the elapsed time period. The elapsed time period may be described in further detail elsewhere herein, including with reference to FIGS. 3 and 4. The network entity 105-a may transmit an uplink grant to schedule transmission of an uplink data packet 225 by the UE 115-a based on the elapsed time period indicated via the scheduling request 230, as described in further detail elsewhere herein, including with reference to FIG. 4.

In some aspects, the UE 115-a may transmit an indication of the elapsed time period via uplink resources dedicated for periodic, aperiodic, or semi-persistent report of the elapsed time period. In some aspects, there may be multiple data packets 225 for transmission by the UE 115-a, and the data packets 225 may be associated with two or more different logical channels. In such cases, there may be an elapsed time period associated with each logical channel identifier (LCID). The network entity 105-a may request which elapsed time periods associated with the data packets 225 are reported by the UE 115-a. Scheduling requests 230 transmitted by the UE 115-a may be associated with logical channels. Accordingly, leveraging a scheduling request 230 to indicate the elapsed time period may be beneficial.

In some aspects, the scheduling request 230 may include a single bit configured to indicate the elapsed time period. For example, if the scheduling request 230 is not multiplexed with HARQ feedback (e.g., HARQ acknowledgment (ACK)), the UE 115-a may transmit a one bit positive or negative scheduling request 230. The UE 115-a may transmit a positive scheduling request 230 if the UE 115-a has data to transmit and a negative scheduling request 230 (e.g., a null request) if the UE 115-a does not have data to transmit. A negative scheduling request 230 may correspond to the UE 115-a refraining from transmitting the scheduling request 230 altogether, in some aspects. Thus, if the UE 115-a transmits a scheduling request 230, the bit may be leveraged to indicate whether the elapsed time period is greater than a threshold time period. A first value of the bit (e.g., value 0) may indicate that the UE 115-a is requesting an uplink grant and that the elapsed time period is greater than the threshold time period (e.g., Twait>Threshold). A second value of the bit (e.g., value 1) may indicate that the UE 115-a is requesting an uplink grant and that the elapsed time period is less than the threshold time period (e.g., Twait<Threshold). The threshold time period may be defined or configured at the UE 115-a (e.g., defined in a standard). Additionally, or alternatively, the network entity 105-a may indicate the threshold time period to the UE 115-a via control signaling (e.g., Layer 1, Layer 2, or Layer 3 signaling), such as RRC signaling, a medium access control-control element (MAC-CE), downlink control information (DCI), a piggyback signal on a physical downlink shared channel (PDSCH) transmission, or any combination thereof.

In some other aspects, the UE 115-a may transmit a multi-bit scheduling request 230 that includes two or more bits (e.g., uplink control information (UCI) via a physical uplink control channel (PUCCH) having a format 2, 3, or 4). The UE 115-a may indicate the elapsed time period via the two or more bits of the scheduling request 230. Additionally, or alternatively, the UE 115-a may indicate an index value via the two or more bits of the scheduling request 230, and the index value may point to the elapsed time period from a set of elapsed time periods. For example, a table of values for the elapsed time period may be defined (e.g., multiple possible time periods or ranges of time periods) or signaled between the network entity 105-a and the UE 115-a. In some aspects, the UE 115-a may indicate a portion of a PDB for the data packet that is remaining after the elapsed time period via the scheduling request 230.

In some other aspects, the network entity 105-a may configure multiple scheduling request configurations for the UE 115-a. The network entity 105-a may transmit control signaling that indicates the scheduling request configurations, such as an RRC message. The network entity 105-a may configure a first configuration or set of configurations from the multiple scheduling request configurations to indicate that the elapsed time is less than the threshold time period and a second configuration or set of configurations from the multiple scheduling request configurations to indicate that the elapsed time is greater than or equal to the threshold time period. The UE 115-a may select one or more scheduling request configurations from the multiple scheduling request configurations to use for transmitting a scheduling request 230 based on the elapsed time period of the data packet 225 at the UE 115-a. The network entity 105-a may determine whether the elapsed time is greater than, equal to, or less than the threshold time period based on the selected scheduling request configuration.

In some aspects, the UE 115-a may be permitted to transmit a scheduling request 230 that indicates the elapsed time period via one or more logical channels that convey QoS flows associated with a latency less than a threshold latency (e.g., relatively strict latency requirements). The UE 115-a may generate a scheduling request 230 to indicate information regarding the elapsed time period via logical channels associated with relatively low latency. The UE 115-a may not be permitted transmit the scheduling request 230 to indicate the elapsed time period via other logical channels that convey QoS flows associated with a latency greater than the threshold latency, and the UE 115-a may instead transmit a scheduling request 230 that does not indicate the elapsed time period via the other logical channels.

In some aspects, there may be two or more data packets 225 at the PDCP layer of the UE 115-a at the same time (e.g., a PDCP queue or buffer of data packets 225 to be transmitted by the UE 115-a). The data packets 225 may be associated with the same or different logical channels, and the same or different elapsed time periods (e.g., each SDU is associated with a respective Twait). For example, the data packets 225 may arrive at the PDCP layer of the UE 115-a at different times, which may cause the different elapsed time periods. In such cases, if the UE 115-a is to transmit a scheduling request 230, the UE 115-a may select a data packet 225 from among the two or more data packets 225 that is associated with a longest elapsed time period for comparison against a threshold. The UE 115-a may transmit the scheduling request 230 to indicate whether or not the longest elapsed time period associated with the selected data packet 225 is greater or less than the threshold time period.

The network entity 105-a may receive the scheduling request 230 that indicates the elapsed time period. The network entity 105-a may determine scheduling information for the UE 115-a based on the elapsed time period. In some aspects, the network entity 105-a may prioritize scheduling resources for data packets 225 that are associated with relatively long elapsed time periods. For example, if the scheduling request 230 indicates that the elapsed time period is greater than the threshold time period (e.g., SR=0), the network entity 105-a may prioritize resource allocation for the corresponding uplink transmission. If the scheduling request 230 indicates that the elapsed time period is less than the threshold time period (e.g., SR=1), the network entity 105-a may continue to assign or allocate uplink resources without prioritization (e.g., the network entity 105-a may interpret the scheduling request 230 as a relatively non-urgent request for uplink resources). Timing aspects related to the scheduling information and uplink grants based on the elapsed time period are described in further detail elsewhere herein, including with reference to FIG. 4.

The UE 115-a may thereby utilize a scheduling request 230 to indicate information related to an elapsed time period since a data packet 225 arrived at the PDCP layer 235 of the UE 115-a. The network entity 105-a may utilize the indicated elapsed time period to calculate an uplink packet delay for the data packet 225 and schedule uplink transmissions by the UE 115-a that satisfy (e.g., do not exceed) a PDB for the UE 115-a. The described techniques for indicating the elapsed time period may improve reliability of wireless communications, reduce latency, support coordination between devices, among other advantages.

In some aspects, uplink data traffic, downlink data traffic, or both for some relatively low-latency applications may be transmitted in a periodic or quasi-periodic manner. For example, the data may include encoded video data (e.g., cloud gaming traffic), in some examples. The video traffic may be periodic or quasi-periodic based on a frame rate of the data. In one aspect, the UE 115-a may receive periodic or quasi-periodic bursts 220 of data traffic every frame (e.g., at one frame-per-second (1/fps), or two possibly staggered per frame at 1/(2*fps)). For example, the data traffic may occur every X seconds, where X may be $\frac{1}{30}$ seconds, $\frac{1}{60}$ seconds, or some other duration depending on a quantity of configured frames per second. A burst 220 of data traffic may be a peak in data traffic and may correspond to a time at which a quantity of bits of data or a quantity of data packets 225 transmitted to or from the UE 115-a exceeds a threshold quantity. In some aspects, the burst 220 of data traffic may correspond to a set of one or more data packets 225 (e.g., internet protocol (IP) packets) which may be transmitted in a related manner or at a relatively high rate, or both. Additionally, or alternatively, the data bursts 220 or peaks may correspond to times at which a quantity of bits of data transfer or a quantity of data packets 225 for one or more UEs 115 is greater than a quantity of bits of data transfer or a quantity of data packets 225 for the one or more UEs 115 at other times. An example of a burst 220 may be multiple slices of a video frame. In the example of FIG. 2, four data packets 225 may be transmitted consecutively or in a relatively short time period, and may correspond to a burst 220.

In some cases, the network entity 105-a may receive uplink traffic including one or more transmission bursts 220 from the UE 115-a, but the network entity may not know when each burst 220 ends. For example, if the UE 115-*a* transmits video traffic, the network entity 105-*a* may not know when the video frame ends without assistance information (e.g., application-layer information) that indicates when the video frame may end. Additionally, or alternatively, the transmission bursts 220 may be associated with data sessions by the UE 115-*a*. For example, the end of a transmission burst 220 may indicate the end of a data session. For discontinuous reception (DRX) (e.g., connected DRX (CDRX)), the UE 115-*a* may terminate a DRX active time and enter a sleep mode after a data session ends. Accordingly, if the network entity 105-*a* does not know when a transmission burst 220 ends, the network entity 105-*a* may continue to schedule communications by the UE 115-*a* during a DRX inactive time, or the network entity 105-*a* may not instruct the UE 115-*a* to enter a sleep mode, or both, which may reduce throughput and increase power consumption by the devices.

Techniques, systems, and devices described herein provide for the UE 115-*a* to utilize a scheduling request 230 to indicate an end of a transmission burst 220. For example, the UE 115-*a* may indicate, via the scheduling request 230, whether a data packet 225 for transmission by the UE 115-*a* (e.g., in a PDCP buffer of the UE 115-*a*) is a final data packet 225 of a set of data packets 225 that correspond to a transmission burst 220. If the scheduling request 230 is transmitted alone (e.g., without multiplexing the scheduling request 230 with HARQ-ACK), the scheduling request 230 may include three states. A first state may correspond to the UE 115-*a* refraining from transmitting the scheduling request 230, which may indicate that the UE 115-*a* does not have data to transmit. A second state may correspond to a first value of a bit in the scheduling request 230 (e.g., SR=1) and may indicate that the UE 115-*a* has data to transmit and that the data packet(s) 225 at the UE 115-*a* include a final data packet 225 of a transmission burst 220. That is, the second state may indicate an end of the transmission burst 220. A Third state may correspond to a second value of the bit in the scheduling request 230 (e.g., SR=0) and may indicate that the UE 115-*a* has data to transmit and that the data packet(s) 225 at the UE 115-*a* do not include a final data packet 225 of a transmission burst 220. That is, the third state may not indicate an end of the transmission burst 220.

The network entity 105-*a* may utilize the indication of the end of the burst 220 to determine scheduling information. In some aspects, if the scheduling request 230 indicates the end of a burst 220, the network entity 105-*a* may transmit a command for the UE 115-*a* to enter a sleep mode (e.g., a CDRX off mode or physical downlink control channel (PDCCH) skipping). Additionally, or alternatively, the UE 115-*a* may be configured to autonomously enter a sleep mode if the UE 115-*a* transmits a scheduling request 230 that indicates the end of a transmission burst 220. In some aspects, the network entity 105-*a*, the UE 115-*a*, or both may select one or more scheduling request configurations based on whether the scheduling request 230 includes an end of burst indication, as described in further detail elsewhere herein, including with reference to FIG. 5.

The UE 115-*a* may transmit the scheduling request 230 based on a status of a buffer at the UE 115-*a*. For example, if there is data available for transmission by the UE 115-*a*, the UE 115-*a* may transmit the scheduling request 230 (e.g., a BSR may trigger the scheduling request 230). Techniques described herein provide for the arrival of a final data packet 225 of a transmission burst 220 including a set of data packets 225 at the PDCP layer 235 of the UE 115-*a* to trigger a scheduling request 230 by the UE 115-*a*. That is, if a data packet 225 arrives at the PDCP layer 235 of the UE 115-*a*, the UE 115-*a* may obtain information regarding the data packet 225, such as whether the data packet 225 is the final packet of a set of data packets 225 associated with a burst 220. If the data packet 225 is the final packet, the UE 115-*a* will transmit the scheduling request 230 including the end of burst indication.

The UE 115-*a* described herein may thereby transmit a scheduling request 230 to indicate information regarding a data packet 225 at a PDCP layer 235 of the UE 115-*a*. The information may include information related to an elapsed time period since the data packet 225 arrived at the PDCP layer 235 of the UE 115-*a*, whether the data packet 225 is a final data packet 225 of a transmission burst 220 (e.g., set of data packets 225), or both. The network entity 105-*a* may utilize the information indicated via the scheduling request to improve scheduling decisions, which may reduce latency, improve resource utilization, and improve throughput and reliability of wireless communications, among other advantages.

Figure 3:
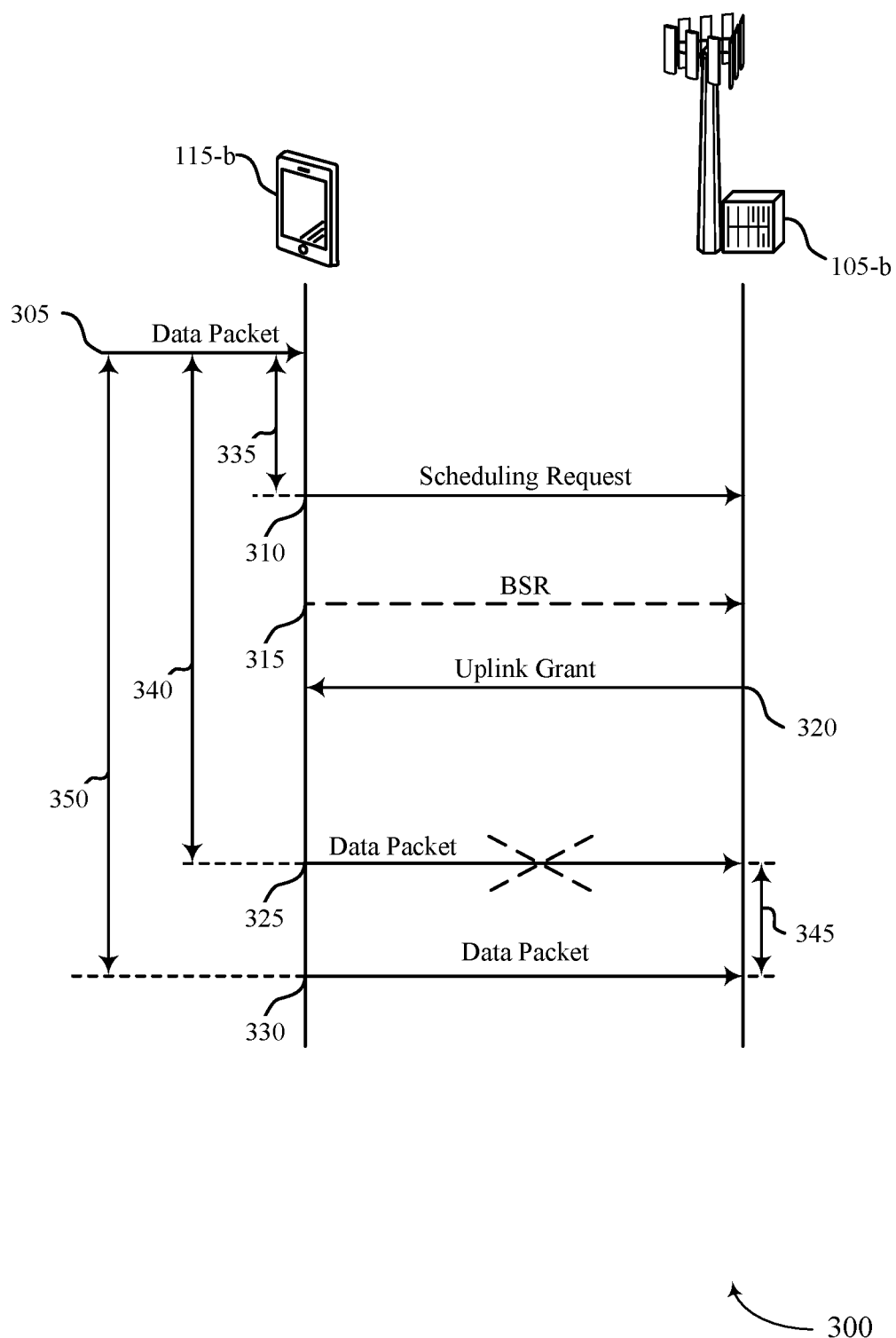
FIG. 3 illustrates an example of a process flow that supports enhanced scheduling request configurations for wireless communications in accordance with one or more aspects of the present disclosure.

FIG. 3 illustrates an example of a process flow 300 that supports enhanced scheduling request configurations for wireless communications in accordance with one or more aspects of the present disclosure. The process flow 300 may implement or be implemented by aspects of wireless communications systems 100 or 200. For example, the process flow 300 illustrates communications of data packets between a UE 115-*b* and a network entity 105-*b*, which may represent aspects of corresponding devices as described with reference to FIGS. 1 and 2. In some aspects, there may be one or more delays associated with transmission of an uplink data packet to a network entity 105-*b*, as illustrated in FIG. 3.

In the following description of the process flow 300, the operations between the UE 115-*b* and the network entity 105-*b* may be performed in different orders or at different times. Some operations may also be left out of the process flow 300, or other operations may be added. Although the UE 115-*b* and the network entity 105-*b* are shown performing the operations of the process flow 300, some aspects of some operations may also be performed by one or more other wireless devices.

At 305, the UE 115-*b* may receive or obtain a data packet. The data packet may represent an example of an SDU that may arrive at a PDCP layer of the UE 115-*b*. The UE 115-*b* may store the arrival time (e.g., T_Arrival) of the time at which the data packet arrives at the PDCP layer (e.g., a PDCP queue) of the UE 115-*b*.

At 310, the UE 115-*b* may transmit a scheduling request to the network entity 105-*b*. The scheduling request may indicate that the UE 115-*b* has data to transmit based on the data packet arriving at the PDCP layer of the UE 115-*b*. In some aspects, the scheduling request may request an uplink grant for the UE 115-*b*. At 315, in some aspects, the UE 115-*b* may transmit a BSR. The BSR may indicate a status of a buffer of the UE 115-*b*, which may correspond to an amount of data or data packets at the PDCP layer of the UE 115-*b*.

In some aspects described herein, the UE 115-*b* may determine an elapsed time period 335 between the arrival time at which the data packet arrived at the PDCP layer of the UE 115-*b* (e.g., packet arrival at a PDCP upper service access point (SAP)) and a current time at which the scheduling request is transmitted. The UE 115-*b* may transmit an indication of the elapsed time period 335 via the scheduling request. In some aspects, the elapsed time period 335 may be an example of an uplink PDCP queuing delay or a portion thereof, where the uplink PDCP queuing delay may be referred to as Twait. The UE 115-b may indicate the elapsed time period 335, information related to the elapsed time period 335 (e.g., whether the elapsed time period 335 is greater than or less than a threshold time period), or both, as described in further detail elsewhere herein, including with reference to FIGS. 2 and 4.

At 320, the network entity 105-b may transmit an uplink grant to the UE 115-b. The uplink grant may schedule or allocate uplink resources, such as physical uplink shared channel (PUSCH) resources, PUCCH resources, or both, for the UE 115-b to use to transmit the data packet. The uplink grant may be based on the information indicated via the scheduling request, the BSR, or both.

At 325, the UE 115-b may transmit the data packet to the network entity 105-b. In some aspects, the UE 115-b may forward the SDU that arrived at 305 to a radio link control (RLC) layer of the UE 115-b in the form of a PDU (e.g., a PDCP PDU). The RLC layer of the UE 115-b may forward the PDU in the form of an RLC PDU to a MAC layer of the UE 115-b, and the MAC layer may transmit the PDU (e.g., via a MAC-CE) to a MAC layer of the network entity 105-b. In some aspects, the data packet transmitted at 325 may not be received by the network entity 105-b, or may not be decoded properly by the network entity 105-b.

In some aspects, the UE 115-b may determine a waiting time period 340 between the arrival time at which the SDU arrived at the PDCP layer of the UE 115-b and a second time at which the first PDU that contains data associated with the SDU is transmitted. In the example of FIG. 3, the waiting time period 340 may be between the arrival of the data packet at 305 and the first data packet transmission at 325. In some aspects, the time at which the first data packet is transmitted by the UE 115-b may be referred to as T_first, and the waiting time period 340 may be referred to as a waiting time or a PDCP queuing delay, Twait (e.g., Twait=T_first-T_arrival). In some other aspects, the T_first time may correspond to a time at which the BSR is transmitted (e.g., a MAC PDU containing the BSR). In some aspects, the waiting time period 340 may represent an example of the uplink PDCP queuing delay, and the elapsed time period 335 indicated via the scheduling request may be a portion of the uplink PDCP queuing delay. The UE 115-b may, indicate, via the scheduling request, the portion of the uplink PDCP queuing delay that is known by the UE 115-b (e.g., that has elapsed so far) at the time the scheduling request is transmitted. A remaining portion of the uplink PDCP queuing delay may occur between the time at which the scheduling request is transmitted and the time at which the uplink grant allocates resources for transmission of the data packet. The PDCP queuing delay (e.g., the waiting time period 340 in FIG. 3) may thereby be based on a timing of the uplink grant.

At 330, the UE 115-b may retransmit the data packet to the network entity 105-b. In this example, the network entity 105-b may successfully receive and decode the retransmission of the data packet. For example, the MAC layer of the network entity 105-b may forward the data packet as an RLC PDU to an RLC layer of the network entity 105-b, and the RLC layer may forward the data packet as a PDCP PDU to a PDCP layer of the network entity 105-b. The PDCP layer may decode the data in the data packet.

An over-the-air (OTA) delay 345 associated with the data packet (e.g., T_Air) may correspond to a time difference between a first reception of the data packet by the network entity 105-b, even if the first reception or decoding of the data packet is unsuccessful, and a successful reception of a last data packet carrying data associated with the SDU that arrived at the PDCP layer of the UE 115-b at 305. In some aspects (not illustrated in FIG. 3), the UE 115-b may perform multiple retransmissions of the data packet. In such cases, the OTA delay 345 may be between the first transmission of the data packet and the last retransmission of the same data packet (e.g., a MAC PDU carrying data from a same SDU), even in the first retransmission is successfully received by the network entity 105-b.

The uplink delay 350 (e.g., a total uplink delay) may be a sum of the waiting time period 340, which may correspond to a waiting time of the data packet at the UE 115-b and the OTA delay 345 associated with the data packet (e.g., UplinkDelay=T_Air+Twait). The waiting time period 340 between the arrival time of the data packet at the PDCP layer of the UE 115-b and the transmission of the data packet may be associated with a respective logical channel. For example, SDUs associated with different LCIDs may be associated with different waiting time periods 340 at the UE 115-b. A length of the waiting time period 340 may be based on one or more factors or parameters associated with uplink communications. The one or more factors may include, for example, a delay until a next scheduling request transmission opportunity (e.g., if the buffer of the UE 115-b was empty prior to the data packet arriving at the UE 115-b), a delay until transmission of the BSR, a delay until a next uplink grant is received, logical channel prioritization, or any combination thereof. Logical channel prioritization may correspond to the UE 115-b prioritizing transmission of data packets associated with higher priority logical channels. For example, if there are multiple data packets in the PDCP queue or buffer of the UE 115-b, the UE 115-b may transmit data associated with high priority logical channels first (e.g., via a first MAC PDU), and the UE 115-b may subsequently transmit data associated with lower priority logical channels (e.g., via a subsequent MAC PDU). The network entity 105-b may, in some cases, not know the waiting time period 340 associated with the delay of the data packet at the UE 115-b. As such, the network entity 105-b may not be capable of calculating or estimating the uplink delay 350 for a given data packet.

Techniques, systems, and devices described herein provide for the UE 115-b to indicate information associated with the waiting time period 340 via a scheduling request transmission. For example, the UE 115-b may indicate information associated with the elapsed time period 335 via the scheduling request transmitted at 310. The information may be related to the arrival time of the SDU in the PDCP queue of the UE 115-b and a waiting time of the data packet through transmission of the scheduling request. For example, the information may indicate the elapsed time period 335, whether the elapsed time period 335 is greater than or less than a threshold time period, or both, as described in further detail elsewhere herein, including with reference to FIGS. 2 and 4.

The network entity 105-b may receive the information related to the elapsed time period 335 via the scheduling request, and the network entity 105-b may adjust (e.g., control or manage) one or more aspects of the OTA delay 345 based on the elapsed time period 335 such that the uplink delay 350 satisfies a delay threshold (e.g., a PDB). For example, the network entity 105-b may adjust a timing of the transmission of the uplink grant or a timing of resources scheduled by the uplink grant, or both such that the uplink delay 350 satisfies a PDB for the UE 115-b. In some aspects, the network entity 105-b may transmit an indication to the UE 115-b to drop the uplink data packet transmission if the network entity 105-b estimates that the OTA delay 345 and the waiting time period 340 may exceed the PDB. Aspects related to timing and scheduling decisions by the network entity 105-b based on the information related to the elapsed time period 335 conveyed via the scheduling request are described in further detail elsewhere herein, including with reference to FIGS. 2 and 4.

Figure 4A:
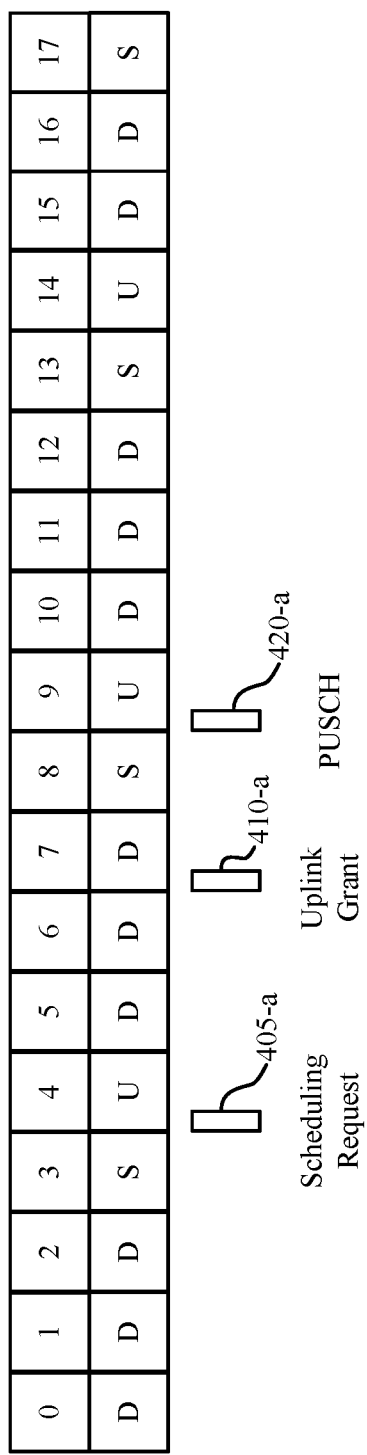
FIGS. 4A and 4B illustrate examples of communication timelines that support enhanced scheduling request configurations for wireless communications in accordance with one or more aspects of the present disclosure.
Figure 4B:
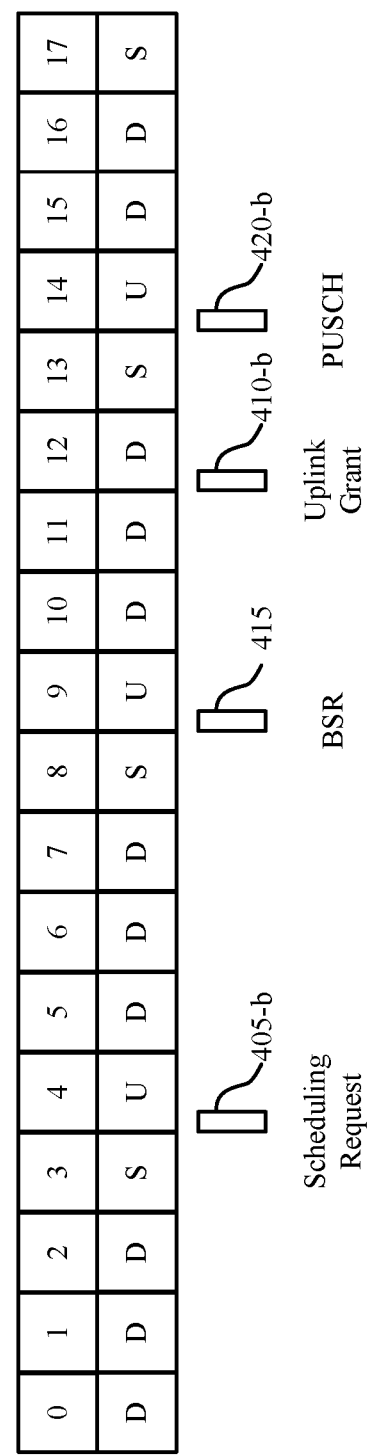

FIGS. 4A and 4B illustrate examples of communication timelines 400 that support enhanced scheduling request configurations for wireless communications in accordance with one or more aspects of the present disclosure. The communication timelines 400-a and 400-b may implement or be implemented by aspects of the wireless communications systems 100 and 200 or the process flow 300. For example, the communication timelines 400-a and 400-b illustrate communications between a UE 115 and a network entity 105, which may represent aspects of corresponding devices as described with reference to FIGS. 1-3. In some aspects, the UE 115 may indicate, via a scheduling request 405, information regarding an elapsed time period since a data packet is obtained at a PDCP layer of the UE 115. The network entity 105 may transmit an uplink grant 410 in response to the scheduling request 405, and the uplink grant 410 may be based on the information indicated via the scheduling request 405.

The UE 115 and the network entity 105 may communicate in accordance with a slot configuration, such that some slots may be allocated for downlink communications and some slots may be allocated for uplink communications. In the example of FIGS. 4A and 4B, the UE 115 and the network entity 105 may communicate in accordance with a DDDSU slot configuration, in which three consecutive slots may be allocated for downlink communications, a subsequent consecutive slot may be allocated as a special slot for uplink, downlink, or both, and a fifth consecutive slot may be allocated for uplink communications. Such a slot pattern may repeat over time. In the example of FIGS. 4A and 4B, the slots numbered 4, 9, and 14 may be allocated for uplink communications and the other slots numbered 0-3, 10-13, and 15-17 may be allocated for downlink communications or as special slots.

The UE 115 may transmit a scheduling request 405 in a first uplink slot after the UE 115 obtains a data packet for transmission. In some aspects, the UE 115 may multiplex the scheduling request 405 with feedback information (e.g., HARQ-ACK). Additionally, or alternatively, the UE 115 may not multiplex the scheduling request 405 with feedback. If the UE 115 does not have data packets for transmission in a buffer of the UE 115, the UE 115 may refrain from transmitting a scheduling request 405, which may be referred to as a negative scheduling request 405 in some aspects (e.g., a null scheduling request). If the UE 115 does have data for transmission, the UE 115 may transmit a positive scheduling request 405 to request an uplink grant 410.

As described herein, the UE 115 may indicate or report, via the scheduling request 405, timing information related to an elapsed time period since an arrival time at which a data packet (e.g., SDU) arrived at the PDCP layer of the UE 115. The elapsed time period may represent an example of the elapsed time period 335 described with reference to FIG. 3. If there are multiple data packets in the queue of the UE 115, the UE 115 may report the elapsed time period associated with a highest priority data packet in the queue, or the UE 115 may report the longest elapsed time period of the elapsed time periods associated with the data packets at the UE 115. If the scheduling request 405 includes more than one bit, the UE 115 may indicate a value of the elapsed time period via the scheduling request, or the UE 115 may indicate an index value that points to the elapsed time period from among a set of potential values of elapsed time periods (e.g., a table). If the scheduling request 405 includes one bit, the UE 115 may indicate whether the elapsed time period is greater than a threshold time period. The threshold time period may be configured at the UE 115 or indicated via control signaling, as described with reference to FIG. 2.

FIG. 4A illustrates a first communication timeline 400-a. In the example of FIG. 4A, the UE 115 may obtain information related to a data packet at the PDCP layer of the UE 115. The UE 115 may determine, based on the obtained information, that an elapsed time period since the data packet was obtained at the PDCP layer of the UE 115 is greater than the threshold time period (e.g., Twait>Threshold). The UE 115 may transmit the scheduling request 405-a in the uplink slot 4. The scheduling request 405-a may request an uplink grant and indicate that the elapsed time period is greater than the threshold time period. For example, the scheduling request 405-a may be transmitted according to a scheduling request configuration that indicates the elapsed time period is greater than the threshold, or a value of a bit in the scheduling request 405-a may indicate that the elapsed time period is greater than the threshold (e.g., a value of 0), or multiple bits in the scheduling request 405-a may indicate a value of the elapsed time period and the network entity 105 may compare the indicated elapsed time period with the threshold.

If the elapsed time period is greater than the threshold time period, the network entity 105 may prioritize resource allocation for the corresponding data packet. The elapsed time period being greater than the threshold time period may indicate that the UE 115 may be approaching a PDB for the data packet. In some aspects, the network entity 105 may provide an uplink grant 410-a for the data packet as soon as possible after receipt of the scheduling request 405-a indicating that the elapsed time period is greater than the threshold such that the uplink delay associated with the data packet may be less than the PDB (e.g., Twait+T_Air<PDB).

In the example of FIG. 4A, the network entity 105 may transmit the uplink grant 410-a via the downlink slot 7. The network entity 105 may transmit the uplink grant 410-a before receiving a BSR from the UE 115 based on the scheduling request 405-a indicating that the elapsed time period is greater than the threshold time period. In some aspects, the network entity 105 may allocate uplink resources for the UE 115 based on a previous allocation for a previous transmission. Additionally, or alternatively, the network entity 105 may over-grant uplink resources via the uplink grant 410-a. The UE 115 may receive the uplink grant 410-a and transmit the data packet via the PUSCH 420-a in the uplink slot 9. The uplink grant 410-a may schedule or allocate uplink resources for the PUSCH 420-a in the slot 9.

FIG. 4B illustrates a communication timeline 400-b. In the example of FIG. 4B, the UE 115 may obtain information related to a data packet at the PDCP layer of the UE 115. The UE 115 may determine, based on the obtained information, that an elapsed time period since the data packet was obtained at the PDCP layer of the UE 115 is less than the threshold time period (e.g., Twait<Threshold). The UE 115 may transmit the scheduling request 405-b in the uplink slot 4. The scheduling request 405-b may request an uplink grant and indicate that the elapsed time period is less than the threshold time period. For example, the scheduling request 405-b may be transmitted according to a scheduling request configuration that indicates the elapsed time period is less than the threshold, or a value of a bit in the scheduling request 405-*b* may indicate that the elapsed time period is less than the threshold (e.g., a value of 1), or multiple bits in the scheduling request 405-*b* may indicate a value of the elapsed time period and the network entity 105 may compare the elapsed time period with the threshold.

If the elapsed time period is less than the threshold time period, the network entity 105 may continue to assign uplink resources for transmissions by the UE 115 and other UEs 115. The network entity 105 may determine that the scheduling request 405-*b* is a relatively non-urgent request for uplink resources, and the network entity 105 may refrain from prioritizing the data packet based on the elapsed time period being less than the threshold. The network entity 105 may instead prioritize other data packets associated with greater elapsed time periods, as described with reference to FIG. 4A.

In this example, the network entity 105 may wait for the UE 115 to transmit a BSR 415 before the network entity 105 allocates uplink resources. The UE 115 may transmit the BSR 415 in the next uplink slot following the scheduling request 405-*b*, which may be slot 9 in the example of FIG. 4B. The BSR 415 may indicate a quantity of data packets or an amount of data for transmission by the UE 115. The UE 115 may transmit the BSR 415 based on the elapsed time period of the data packet being less than the threshold time period. The network entity 105 may receive the BSR 415 and determine available uplink resources for transmission by the UE 115. The network entity 105 may transmit the uplink grant 410-*b* via the downlink slot 12. The uplink grant 410-*b* may allocate uplink resources in the subsequent uplink slot 14. The UE 115 may transmit the data packet via the PUSCH 420-*b* in the uplink slot 14.

By transmitting a scheduling request 405 to indicate whether a data packet is associated with a relatively high waiting time (e.g., above a threshold), the UE 115 may inform scheduling decisions by the network entity 105. For example, if the scheduling request 405 indicates a relatively long waiting time period, the UE 115 may receive an uplink grant 410 and perform a corresponding uplink transmission relatively quickly, such that a PDB may be satisfied. The described techniques may thereby provide for improved coordination between devices, improved throughput, and improved reliability of communications, among other advantages.

Figure 5:
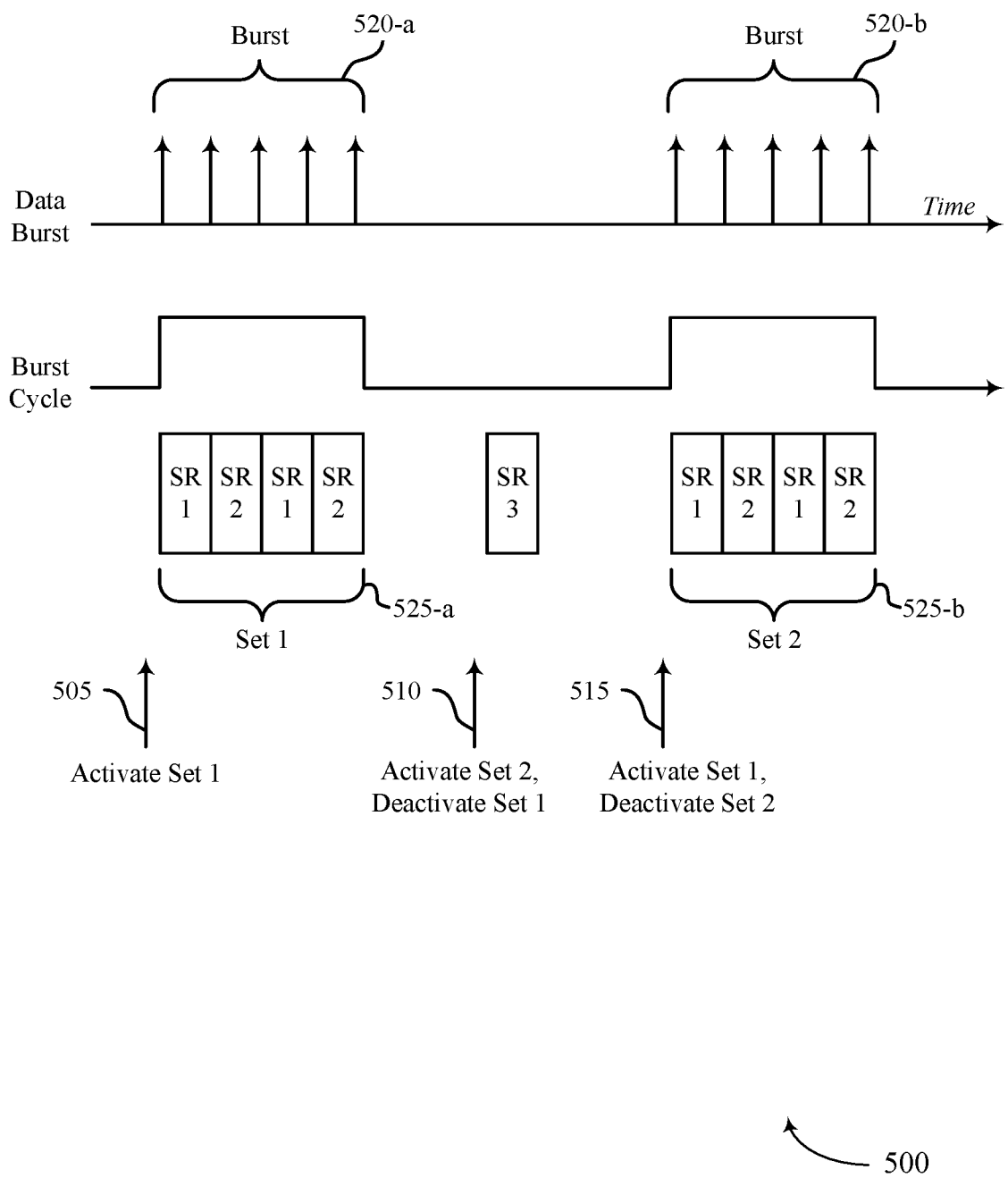
FIG. 5 illustrates an example of a scheduling request configuration timeline that supports enhanced scheduling request configurations for wireless communications in accordance with one or more aspects of the present disclosure.

FIG. 5 illustrates an example of a scheduling request configuration timeline 500 that supports enhanced scheduling request configurations for wireless communications in accordance with one or more aspects of the present disclosure. The scheduling request configuration timeline 500 may implement or be implemented by aspects of the wireless communications systems 100 and 200 described with reference to FIGS. 1 and 2. For example, the scheduling request configuration timeline 500 illustrates timing for activation and deactivation of scheduling request configurations during communications between a UE 115 and a network entity 105, which may represent examples of corresponding devices as described with reference to FIGS. 1-4. As described with reference to FIG. 2, the UE 115 may transmit uplink data traffic in a periodic or semi-periodic manner. For example, the data traffic may be transmitted in one or more bursts 520, which may represent examples of the bursts 220 described with reference to FIG. 2.

In the example of FIG. 5, the UE 115 may transmit uplink data in accordance with a burst cycle. The UE 115 may transmit a first burst 520-*a* of data during a first portion of a first burst cycle period, and the UE 115 may refrain from transmitting uplink data or may reduce a quantity or rate of uplink data transmissions for a remainder of the first burst cycle period. The UE 115 may transmit a second burst 520-*b* of data during a first portion of a second burst cycle period, and the UE 115 may refrain from transmitting uplink data or may reduce a quantity or rate of uplink data transmissions for a remainder of the second burst cycle period. Each burst 520 may correspond to a set of data packets, in some aspects. In some aspects, a rate of transmission or a quantity of bits of data transmitted during the bursts 520 may be greater than a rate or quantity of bits of data transmitted outside of the bursts 520.

The UE 115 may receive control signaling (e.g., an RRC configuration) that configures one or more scheduling request configurations. Each scheduling request configuration may be associated with a respective logical channel. In some cases, the logical channel may trigger a scheduling request. For example, a logical channel group associated with a first priority may be mapped to a first scheduling request configuration and a logical channel group associated with a second priority may be mapped to a second scheduling request configuration. When the UE 115 transmits a scheduling request, the network entity 105 may detect the corresponding scheduling request configuration to determine how urgent the request may be. Each scheduling request configuration may be associated with one or more timing parameters for scheduling request transmission, such as a prohibit timer, a maximum quantity of transmissions, some other timing parameters, or any combination thereof. Additionally, or alternatively, each scheduling request configuration may be associated with a set of resources allocated for scheduling requests. There may be a maximum quantity of scheduling request configurations configured per cell group (e.g., max NrofSR-ConfigPerCellGroup).

In some aspects, a scheduling request configuration may be associated with a BSR configuration. The BSR configuration may indicate a type of BSR (e.g., periodic, aperiodic, trigger-based). It may be beneficial to dynamically activate or deactivate scheduling request configurations for a same logical channel dynamically. For example, by adapting a frequency of scheduling request transmissions (e.g., by dynamically changing scheduling request configurations), allocation of uplink resources may be improved.

Techniques, systems, and devices described herein provide for a network entity 105 and a UE 115 to match sets of scheduling request configurations to transmission bursts 520. For example, the devices may shape which scheduling request configurations are activated over time to match or replicate the traffic bursts 520 associated with some applications (e.g., XR). The UE 115 may transmit more scheduling requests more frequently during the bursts 520 than outside of the uplink bursts 520. As such, scheduling request configurations associated with frequent or dense scheduling request and BSR reporting may be activated during the bursts 520 and scheduling request configurations associated with less frequent or dense scheduling request and BSR reporting may be activated outside of the bursts 520.

The network entity 105 described herein may configure multiple different sets of scheduling request configurations, including the sets 525-*a* and 525-*b*. Each set of scheduling request configurations may include one or more scheduling request configurations and may be mapped to one or more logical channel groups. For example, the set 525-*a* may include two scheduling request configurations (e.g., Set 1={SR configuration 1, SR configuration 2}). The set 525-*b* may include a single scheduling request configuration (e.g., Set 2={SR configuration 3}). Different logical channels may trigger the scheduling requests in each set 525. The sets 525 may be activated and deactivated based on the transmission characteristics of the bursts 520. For example, it may be beneficial to activate a set 525 of scheduling request configurations that is associated with relatively infrequent scheduling request transmissions in between the bursts 520 and to activate a set 525 of scheduling request configurations that is associated with relatively frequent scheduling request transmissions during the bursts 520. The set 525 associated with relatively infrequent scheduling request transmissions may be associated with a smaller quantity of resources, which may improve resource utilization.

In the example of FIG. 5, the first set 525-a (e.g., Set 1) of scheduling request configurations 1 and 2 may be associated with more frequent scheduling request transmissions and more resources allocated for scheduling request transmissions than the second set 525-b (e.g., Set 2) of the scheduling request configuration 3. Accordingly, at 505, the first set 525-a may be activated. The first set 525-a may be activated before or at the same time as the start of the transmission burst 520-a. The first set 525-a may be used for scheduling request transmissions, BSR transmissions, or both by the UE 115 during the burst 520-a. Subsequently, at 510, the second set 525-b may be activated and the first set 525-a may be deactivated. The activation of the second set 525-b and the deactivation of the first set 525-a may occur at the same time as or after a final data packet of the burst 520-a is transmitted (e.g., an end of the burst 520-a). The UE 115 may transmit scheduling requests, BSRs, or both in accordance with the second set 525-b during the remainder of the first burst cycle period. At 515, the first set 525-a may be reactivated and the second set 525-b may be deactivated. The first set 525-a may be reactivated and the second set 525-b may be deactivated before or at the same time as the start of the transmission burst 520-b. The UE 115 may transmit scheduling requests, BSRs, or both in accordance with the first set 525-a during the burst 520-b. By using the second set 525-b between transmission bursts 520, fewer resources may be allocated for scheduling request and BSR transmissions, which may reduce power consumption and improve efficient allocation of resources.

In some aspects, the network entity 105 may activate or deactivate the sets 525 of scheduling request configurations. The network entity 105 may receive UE assistance information that indicates a burst periodicity, an arrival time, an end time, or any combination thereof associated with the bursts 520. Additionally, or alternatively, the UE 115 may obtain the traffic information based on machine learning or a cross layer application (e.g., a modem). The network entity 105 may transmit control signaling to dynamically activate and deactivate the sets 525 based on the timing information associated with the bursts 520. The control signaling may include DCI, a MAC-CE, an RRC signal, or any combination thereof (e.g., Layer 1, Layer 2, or Layer 3 signaling) to activate or deactivate sets 525 of scheduling request configurations. In some aspects.

In some aspects, the sets 525 may be activated and deactivated based on an internal timer or a configured timer at the UE 115, the network entity 105, or both. For example, a timer may be configured based on the burst cycle periodicity, and the devices may activate and deactivate the sets 525 in accordance with the timer. Additionally, or alternatively, the sets 525 may be activated or deactivated based on an end of a burst 520 or an end of burst indication transmitted via a scheduling request, or both. For example, if the burst 520 ends, or if the UE 115 transmits a scheduling request that indicates a data packet at a PDCP layer of the UE 115 is a final data packet of the transmission burst 520, the second set 525-b may be activated and the first set 525-a may be deactivated based on the end of the burst 520 (e.g., the UE 115 may activate a set 525 of scheduling request configurations associated with relatively sparse scheduling request transmissions).

In some aspects, the UE 115 may transmit uplink signaling (e.g., a MAC-CE) that includes assistance information to the network entity to indicate one or more sets 525 of scheduling request configurations that may be preferred by the UE 115. The assistance information may indicate a time period associated with each set 525. For example, the UE 115 may indicate that the UE 115 prefers the first set 525-a during the bursts 520 and the second set 525-b during remaining portions of the burst cycle period that are outside of the bursts 520.

The sets 525 of scheduling request configurations may, in some aspects be associated with respective reporting configurations for BSR, SRS, or CSI. For example, the first set 525-a may be associated with periodic or trigger based BSR and the second set 525-b may be associated with aperiodic or trigger based BSR. Additionally, or alternatively, the first set 525-a may be associated with an SRS configuration that corresponds to a relatively dense SRS resource allocation, or with a CSI reporting configuration that corresponds to a relatively dense CSI resource allocation, or both. The second set 525-b may be associated with an SRS configuration that corresponds to a relatively sparse SRS resource allocation, or with a CSI reporting configuration that corresponds to a relatively sparse CSI resource allocation, or both. The scheduling request configurations that are associated with periodic BSR reporting, relatively dense SRS resource allocation, and/or relatively dense CSI resource allocation may be activated during the transmission bursts 520 to provide sufficient opportunities for the UE 115 to transmit a BSR, measure SRS, or report CSI when the UE 115 is actively transmitting a relatively large quantity of data. The scheduling request configurations associated with the aperiodic BSR reporting may be activated during the time periods between transmission bursts 520 to reduce resources allocated for BSR reporting, SRS measurements, and CSI reporting when the UE 115 is transmitting a relatively small quantity of data. Additionally, or alternatively, the sets 525 of scheduling request The described techniques may thereby support dynamic activation and deactivation of sets 525 of scheduling request configurations to provide for matching scheduling request configurations with transmission burst periodicities. The dynamic activation and deactivation may provide for fewer allocated scheduling request resources during time periods between transmission bursts 520 and more resources allocated for scheduling requests, BSRs, and CSI reporting during the transmission bursts 520.

Figure 6:
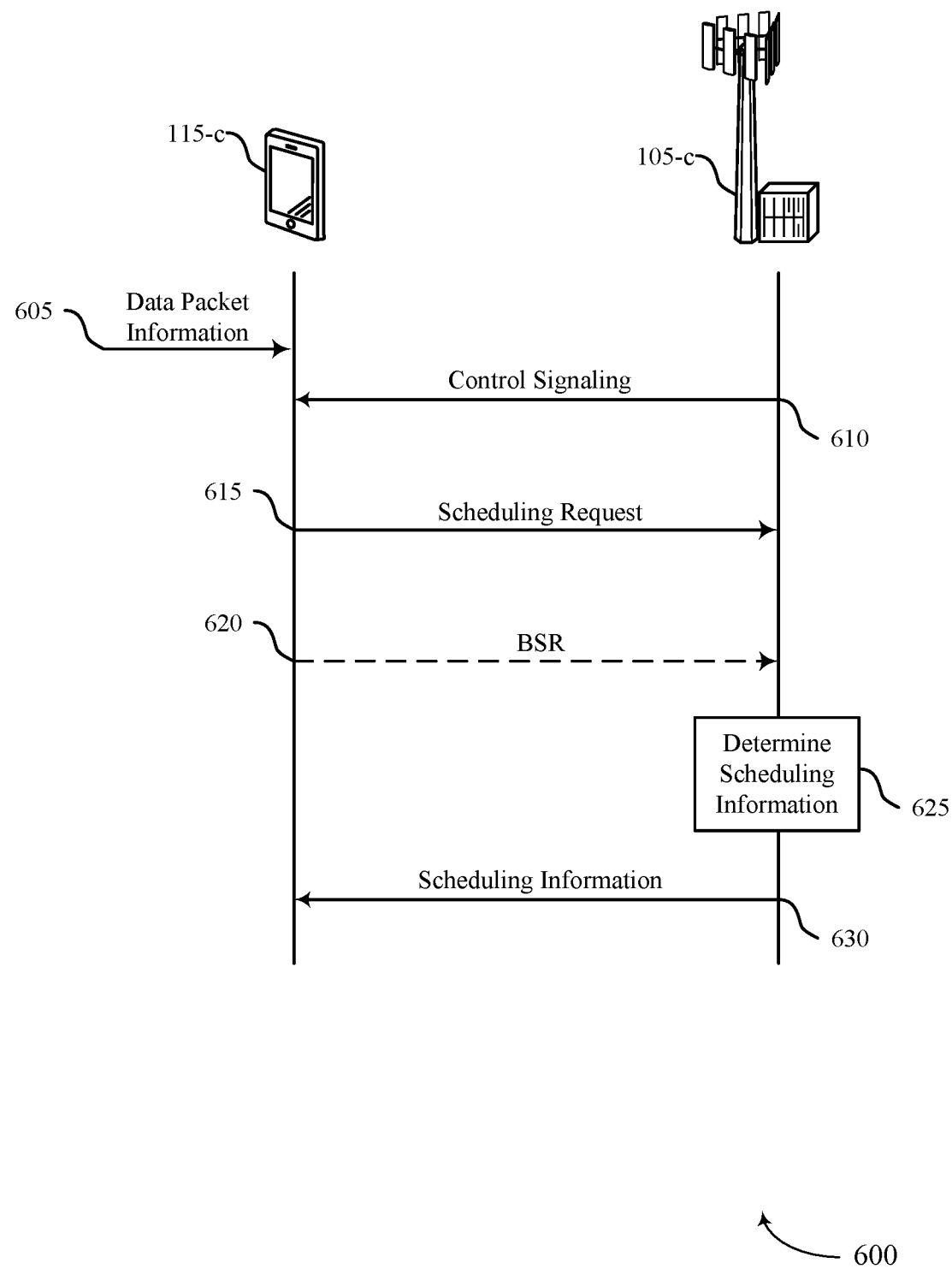
FIG. 6 illustrates an example of a process flow that supports enhanced scheduling request configurations for wireless communications in accordance with one or more aspects of the present disclosure.

FIG. 6 illustrates an example of a process flow 600 that supports enhanced scheduling request configurations for wireless communications in accordance with one or more aspects of the present disclosure. The process flow 600 may implement or be implemented by aspects of wireless communications systems 100 or 200. For example, the process flow 600 illustrates communications of data packets between a UE 115-c and a network entity 105-c, which may represent aspects of corresponding devices as described with reference to FIGS. 1-5. In some aspects, the UE 115-c may indicate, via a scheduling request, information regarding an elapsed time period between a data packet arriving at a PDCP layer of the UE 115-c, or whether the data packet is a final data packet of a burst transmission, or both.

In the following description of the process flow 600, the operations between the UE 115-c and the network entity 105-c may be performed in different orders or at different times. Some operations may also be left out of the process flow 600, or other operations may be added. Although the UE 115-c and the network entity 105-c are shown performing the operations of the process flow 600, some aspects of some operations may also be performed by one or more other wireless devices.

At 605, the UE 115-c may obtain, at a PDCP layer of the UE 115-c, information associated with a data packet for transmission by the UE 115-c. For example, the data packet may arrive at a PDCP queue or buffer of the UE 115-c. The information may include an arrival time of the data packet at the PDCP layer of the UE 115-c, an index or position of the data packet relative to other data packets of a burst transmission, some other information, or any combination thereof.

At 610, in some aspects, the network entity 105-c may transmit control signaling to the UE 115-c. The control signaling may be transmitted before, at the same time as, or after the UE 115-c obtains the data packet information. The control signaling may configure one or more scheduling request configurations for the UE 115-c, may configure a scheduling request to indicate information regarding an elapsed time period associated with the data packet, may configure the scheduling request to indicate whether the data packet is a final data packet of a burst transmission, or any combination thereof.

At 615, the UE 115-c may transmit a scheduling request to the network entity 105-c based on obtaining the information associated with the data packet at the PDCP layer of the UE 115-c. The scheduling request may indicate information regarding an elapsed time period since the information associated with the data packet was obtained at the PDCP layer of the UE 115-c, or whether the data packet is a final data packet of a set of data packets, or both. The elapsed time period may correspond to a difference between a current time at which the scheduling request is transmitted and the arrival time at which the data packet arrived at the PDCP layer of the UE 115-c, as described in further detail elsewhere herein, including with reference to FIGS. 3 and 4. The set of data packets may correspond to a burst transmission.

The information indicated via the scheduling request may, in some aspects, be based on the control signaling. For example, if the control signaling configures a scheduling request to indicate the elapsed time period, the UE 115-c may indicate information regarding the elapsed time period via the scheduling request. If the control signaling configures a scheduling request to indicate an end of a burst transmission, the UE 115-c may indicate whether the data packet is a final data packet of a set of data packets corresponding to the burst transmission via the scheduling request. The UE 115-c may indicate the information regarding an elapsed time period since the information associated with the data packet was obtained at the PDCP layer of the UE 115-c, or whether the data packet is a final data packet of a set of data packets, or both by setting one or more bits in the scheduling request, by selecting a scheduling request configuration from among a set of multiple scheduling request configurations, or both.

At 620, in some aspects, the UE 115-c may transmit a BSR to the network entity 105-c. The BSR may indicate information related to a quantity of bits of data available for transmission by the UE 115-c. In some aspects, the UE 115-c may transmit the BSR if the elapsed time period associated with the data packet is less than a threshold time period. If the elapsed time period is greater than a threshold time period, the UE 115-c may refrain from transmitting the BSR, in some aspects.

At 625, the network entity 105-c may determine scheduling information for uplink communications by the UE 115-c based on the information indicated via the scheduling request, the BSR, or both. For example, the network entity 105-c may determine the scheduling information based on the information regarding the elapsed time period, based on whether the data packet is a final data packet of a burst transmission, or both. The scheduling information may include a time at which to transmit an uplink grant for the UE 115-c, timing for allocating uplink resources for transmissions by the UE 115-c, whether to instruct the UE 115-c to enter a sleep mode, or any combination thereof. In some aspects, if the scheduling request indicates that the elapsed time period is less than a threshold, the network entity 105-c may delay allocating uplink resources for the UE 115-c while waiting for the BSR and may prioritize other transmissions. If the scheduling request indicates that the elapsed time period is greater than the threshold, the network entity 105-c may prioritize relatively quick transmission of an uplink grant and allocation of uplink resources for the UE 115-c. If the scheduling request indicates an end of a burst transmission, the network entity 105-c may determine that the UE 115-c may enter a sleep or power savings mode, which may affect resource allocations.

At 630, the network entity 105-c may transmit the scheduling information for the uplink communications by the UE 115-c. The network entity 105-c may transmit an uplink grant, a command to enter a sleep mode, control signaling to activate or deactivate scheduling request configurations, or any combination thereof. The UE 115-c may transmit the uplink data packet as part of the uplink communications based on the scheduling message.

Figure 7:
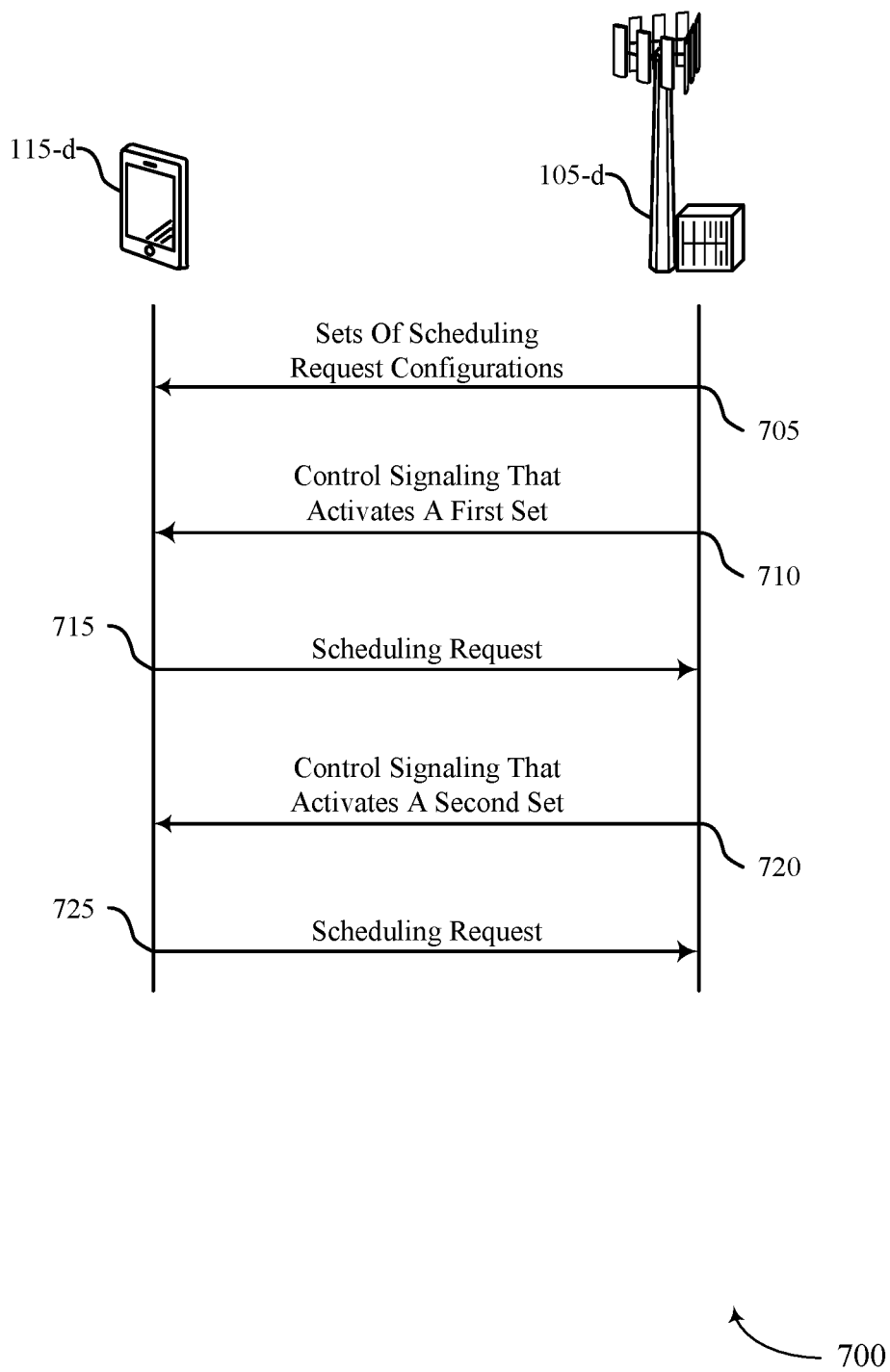
FIG. 7 illustrates an example of a process flow that supports enhanced scheduling request configurations for wireless communications in accordance with one or more aspects of the present disclosure.

FIG. 7 illustrates an example of a process flow 700 that supports enhanced scheduling request configurations for wireless communications in accordance with one or more aspects of the present disclosure. The process flow 700 may implement or be implemented by aspects of wireless communications systems 100 or 200. For example, the process flow 700 illustrates communications of data packets between a UE 115-d and a network entity 105-d, which may represent aspects of corresponding devices as described with reference to FIGS. 1-6. In some aspects, the network entity 105-d may configure multiple scheduling request configurations for the UE 115-c. The scheduling request configurations may be activated and deactivated dynamically based on communications by the UE 115-d.

In the following description of the process flow 700, the operations between the UE 115-d and the network entity 105-d may be performed in different orders or at different times. Some operations may also be left out of the process flow 700, or other operations may be added. Although the UE 115-d and the network entity 105-d are shown performing the operations of the process flow 700, some aspects of some operations may also be performed by one or more other wireless devices.

At 705, the network entity 105-d may transmit control signaling that configures multiple sets of scheduling request configurations. Each set of scheduling request configurations may include one or more scheduling request configurations, which each may be associated with a respective logical channel and one or more respective scheduling request timing parameters, as described with reference to FIG. 5. For example, each scheduling request configuration may be associated with a respective BSR periodicity, a respective SRS configuration, a respective CSI reporting configuration, or any combination thereof.

At 710, in some aspects, the network entity 105-*d* may transmit control signaling that activates a first set of scheduling request configurations from among the multiple configured sets of scheduling request configurations. The control signaling may activate the first set of scheduling request configurations for a time period associated with a burst transmission by the UE 115-*d* (e.g., a time period over which a set of data packets are transmitted by the UE 115-*d*).

At 715, the UE 115-*d* may transmit one or more scheduling requests in accordance with the first set of scheduling request configurations. The UE 115-*d* may, in some aspects, transmit the scheduling request while the UE 115-*d* transmits uplink data packets (e.g., at the same time as an uplink data packet or in between uplink data packets of a set of uplink data packets). For example, the UE 115-*d* may be transmitting a burst transmission, and the UE 115-*d* may transmit the scheduling request to request resources for transmission of remaining data packets of the burst transmission. In some aspects, the UE 115-*d* may indicate information regarding an elapsed time period associated with a data packet, or whether the data packet is a final data packet of a burst transmission, or both via the scheduling request, as described with reference to FIG. 6.

At 720, in some aspects, the network entity 105-*d* may transmit control signaling that activates a second set of scheduling request configurations from among the multiple configured sets of scheduling request configurations and that deactivates the first set of scheduling request configurations for a second time period between burst transmissions by the UE 115-*d*. Additionally, or alternatively, the UE 115-*d* may determine that the first set is deactivated and the second set is activated based on the UE 115-*d* transmitting an indication that a data packet is a final data packet of a burst transmission (e.g., an end of burst indication) via the scheduling request, or based on a configured timer, or both.

At 725, the UE 115-*d* may transmit a scheduling request in accordance with the second set of scheduling request configurations. In some aspects, the UE 115-*d* may indicate information regarding an elapsed time period associated with a data packet, or whether the data packet is a final data packet of a burst transmission, or both via the scheduling request, as described with reference to FIG. 6. In some aspects, the UE 115-*d* may transmit fewer scheduling requests between burst transmissions in accordance with the second set of scheduling request configurations than during burst transmissions in accordance with the first set of scheduling request configurations. By dynamically activating and deactivating scheduling request configurations to match the burst transmissions by the UE 115-*d*, the UE 115-*d* and the network entity 105-*d* may reduce latency, reduce unnecessary resource allocation, reduce power consumption, and improve throughput, among other advantages.

Figure 8:
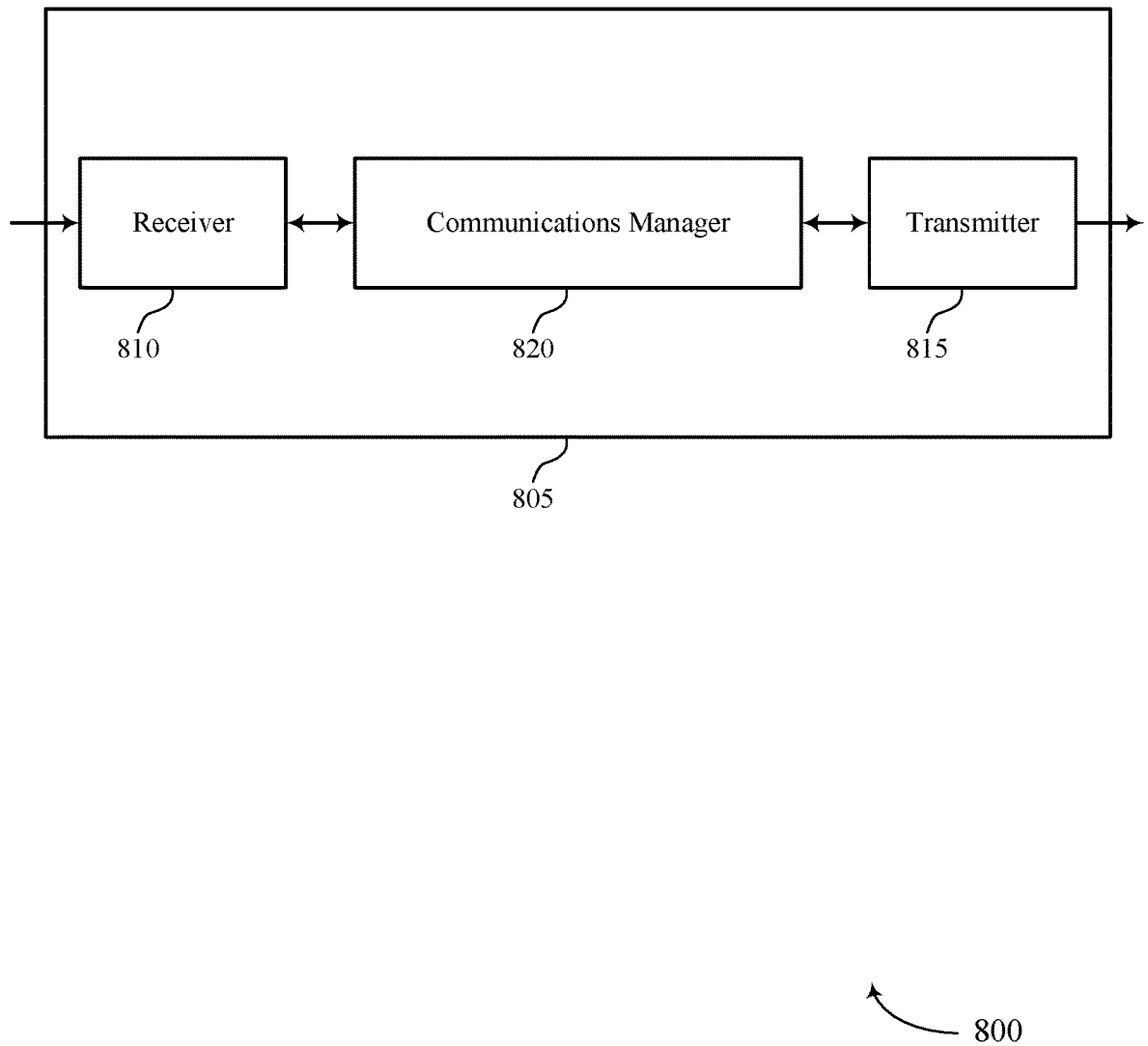
FIGS. 8 and 9 show block diagrams of devices that support enhanced scheduling request configurations for wireless communications in accordance with one or more aspects of the present disclosure.

FIG. 8 shows a block diagram 800 of a device 805 that supports enhanced scheduling request configurations for wireless communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enhanced scheduling request configurations for wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhanced scheduling request configurations for wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of enhanced scheduling request configurations for wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for obtaining, at a PDCP layer of the UE, information associated with a data packet for transmission by the UE. The communications manager 820 may be configured as or otherwise support a means for transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The communications manager 820 may be configured as or otherwise support a means for receiving scheduling information for communications by the UE, the scheduling information based on the elapsed time period, or whether the data packet includes the final packet of the set of data packets, or both.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources, among other advantages.

Figure 9:
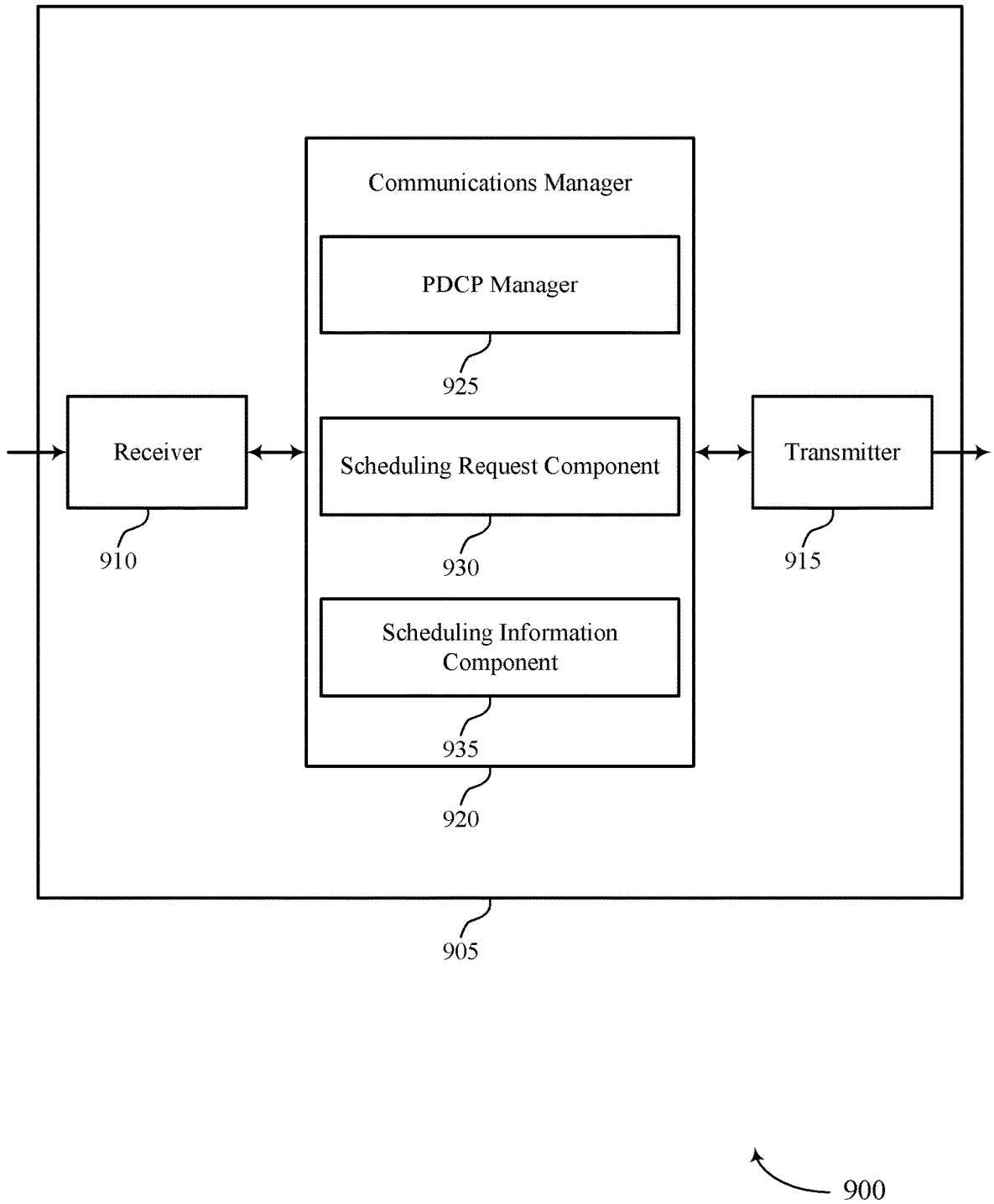

FIG. 9 shows a block diagram 900 of a device 905 that supports enhanced scheduling request configurations for wireless communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to enhanced scheduling request configurations for wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to enhanced scheduling request configurations for wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of enhanced scheduling request configurations for wireless communications as described herein. For example, the communications manager 920 may include a PDCP manager 925, a scheduling request component 930, a scheduling information component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The PDCP manager 925 may be configured as or otherwise support a means for obtaining, at a PDCP layer of the UE, information associated with a data packet for transmission by the UE. The scheduling request component 930 may be configured as or otherwise support a means for transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The scheduling information component 935 may be configured as or otherwise support a means for receiving scheduling information for communications by the UE, the scheduling information based on the elapsed time period, or whether the data packet includes the final packet of the set of data packets, or both.

Figure 10:
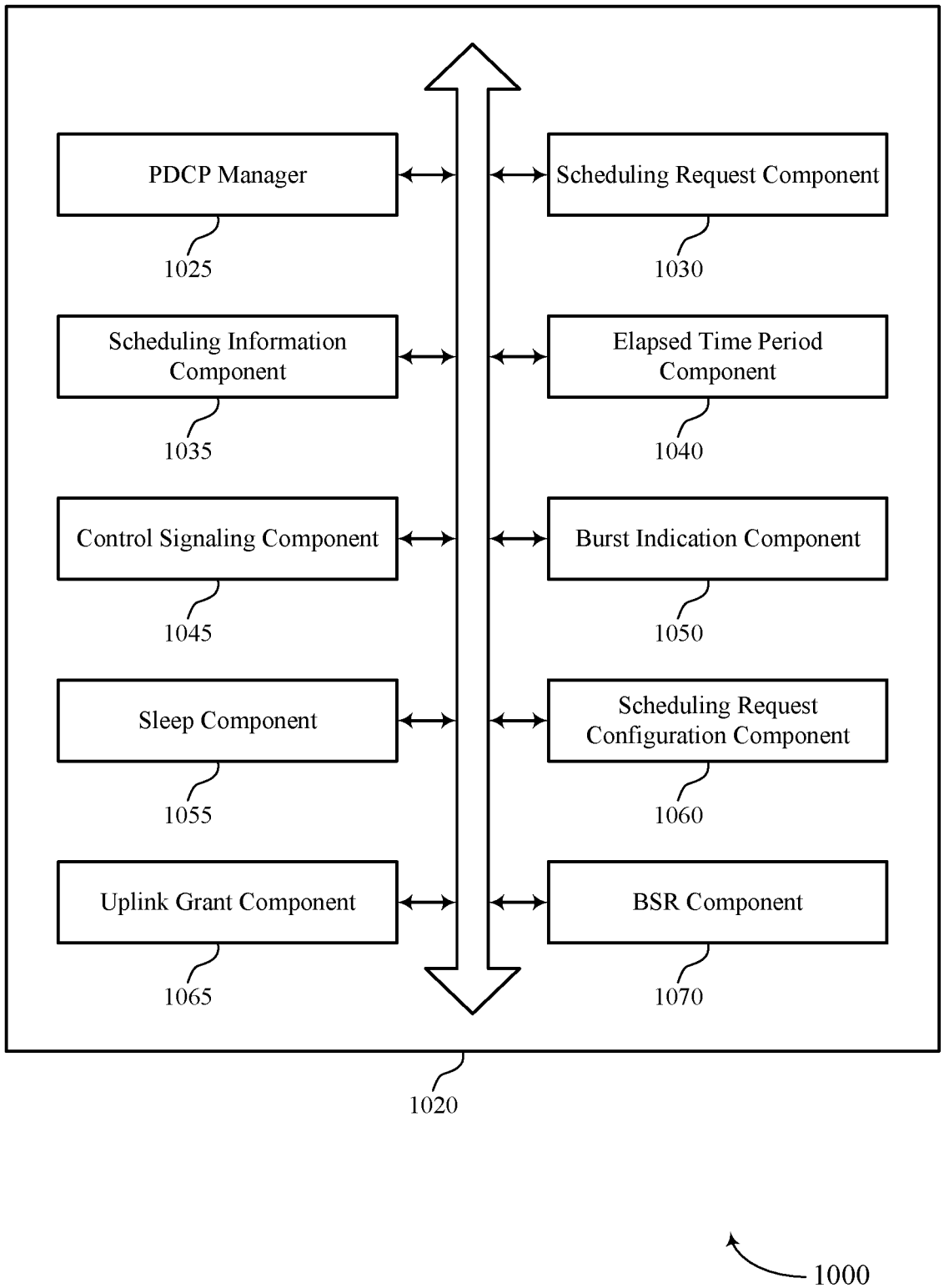
FIG. 10 shows a block diagram of a communications manager that supports enhanced scheduling request configurations for wireless communications in accordance with one or more aspects of the present disclosure.

FIG. 10 shows a block diagram 1000 of a communications manager 1020 that supports enhanced scheduling request configurations for wireless communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of enhanced scheduling request configurations for wireless communications as described herein. For example, the communications manager 1020 may include a PDCP manager 1025, a scheduling request component 1030, a scheduling information component 1035, an elapsed time period component 1040, a control signaling component 1045, a burst indication component 1050, a sleep component 1055, a scheduling request configuration component 1060, an uplink grant component 1065, an BSR component 1070, or any combination thereof. Each of these components may communicate, directly or indirectly, with one another (e.g., via one or more buses).

The communications manager 1020 may support wireless communication at a UE in accordance with examples as disclosed herein. The PDCP manager 1025 may be configured as or otherwise support a means for obtaining, at a PDCP layer of the UE, information associated with a data packet for transmission by the UE. The scheduling request component 1030 may be configured as or otherwise support a means for transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The scheduling information component 1035 may be configured as or otherwise support a means for receiving scheduling information for communications by the UE, the scheduling information based on the elapsed time period, or whether the data packet includes the final packet of the set of data packets, or both.

In some examples, to support transmitting the scheduling request, the elapsed time period component 1040 may be configured as or otherwise support a means for transmitting, within the scheduling request, a bit that indicates a request for an uplink grant and whether the elapsed time period is greater than a threshold time period, where the bit having a first value indicates that the elapsed time period is greater than the threshold time period and the bit having a second value indicates that the elapsed time period is less than the threshold time period.

In some examples, the bit may have the first value, and to support receiving the scheduling information, the uplink grant component 1065 may be configured as or otherwise support a means for receiving the uplink grant, where a timing associated with the uplink grant is based on the bit of the scheduling request having the first value.

In some examples, the bit may have the second value, and the BSR component 1070 may be configured as or otherwise support a means for transmitting a BSR after transmitting the scheduling request based on the elapsed time period being less than the threshold time period, where receiving the scheduling information includes. In some examples, the bit has the second value, and the uplink grant component 1065 may be configured as or otherwise support a means for receiving the uplink grant in response to the BSR, where receiving the scheduling information after transmitting the BSR is based on the bit of the scheduling request having the second value.

In some examples, the control signaling component 1045 may be configured as or otherwise support a means for receiving control signaling that indicates a set of multiple scheduling request configurations each associated with a respective logical channel. In some examples, the elapsed time period component 1040 may be configured as or otherwise support a means for selecting, based on the elapsed time period and a threshold time period, a scheduling request configuration from the set of multiple scheduling request configurations for transmitting the scheduling request, where a first scheduling request configuration of the set of multiple scheduling request configurations is for indicating that the elapsed time period is less than the threshold time period and a second scheduling request configuration of the set of multiple scheduling request configurations is for indicating that the elapsed time period is greater than or equal to the threshold time period.

In some examples, the elapsed time period component 1040 may be configured as or otherwise support a means for generating the scheduling request to indicate the information regarding the elapsed time period based on a quality of service associated with a logical channel corresponding to the data packet.

In some examples, the elapsed time period component 1040 may be configured as or otherwise support a means for determining that the elapsed time period is a longest time period of a set of multiple elapsed time periods associated with a set of multiple data packets for transmission by the UE. In some examples, the elapsed time period component 1040 may be configured as or otherwise support a means for selecting the data packet from among the set of multiple data packets based on the elapsed time period being the longest time period, where the scheduling request indicates the information regarding the elapsed time period for the data packet based on the data packet being selected from among the set of multiple data packets.

In some examples, the scheduling request includes two or more bits configured to indicate the information regarding the elapsed time period, information regarding a portion of a PDB that is remaining for the data packet after the elapsed time period, or both. In some examples, the elapsed time period component 1040 may be configured as or otherwise support a means for transmitting, via the two or more bits of the scheduling request, an index value that points to a value or range of the elapsed time period from among a set of elapsed time period values or ranges.

In some examples, to support transmitting the scheduling request, the burst indication component 1050 may be configured as or otherwise support a means for transmitting, within the scheduling request, a bit that indicates a request for an uplink grant and whether the data packet includes the final packet of the set of data packets, where the bit having a first value indicates that the data packet includes the final packet of the set of data packets and the bit having a second value indicates that the data packet is not the final packet of the set of data packets.

In some examples, to support receiving the scheduling information, the scheduling information component 1035 may be configured as or otherwise support a means for receiving, via the scheduling information, a CDRX command based on the scheduling request indicating that the data packet includes the final packet of the set of data packets. In some examples, to support receiving the scheduling information, the sleep component 1055 may be configured as or otherwise support a means for entering a sleep mode based on the connected discontinuous reception command.

In some examples, the control signaling component 1045 may be configured as or otherwise support a means for receiving RRC signaling that configures the scheduling request to indicate the information regarding the elapsed time period, or to indicate whether the data packet includes the final packet of the set of data packets, or both, where content of the scheduling request is based on the RRC signaling.

In some examples, the scheduling request configuration component 1060 may be configured as or otherwise support a means for receiving control signaling that configures a set of multiple sets of scheduling request configurations, where each set of scheduling request configurations of the set of multiple sets is associated with a respective logical channel and one or more respective scheduling request timing parameters.

In some examples, the control signaling component 1045 may be configured as or otherwise support a means for receiving second control signaling that activates a first set of scheduling request configurations from among the set of multiple sets of scheduling request configurations for a time period associated with a burst transmission by the UE, where the set of data packets includes a first burst transmission. In some examples, the control signaling component 1045 may be configured as or otherwise support a means for receiving third control signaling that activates a second set of scheduling request configurations from among the set of multiple sets of scheduling request configurations for a second time period between burst transmissions by the UE.

In some examples, the scheduling request may be transmitted in accordance with a first set of scheduling request configurations from among the set of multiple sets of scheduling request configurations, and the scheduling request component 1030 may be configured as or otherwise support a means for transmitting, after transmitting the scheduling request and based on the data packet including the final packet of the uplink burst transmission, a second scheduling request in accordance with a second set of scheduling request configurations from among the set of multiple sets of scheduling request configurations.

In some examples, each scheduling request configuration of the set of multiple sets of scheduling request configurations may be associated with a respective BSR periodicity, a respective SRS configuration, a respective CSI reporting configuration, or any combination thereof.

In some examples, the scheduling request configuration component 1060 may be configured as or otherwise support a means for transmitting assistance information that indicates a preferred set of scheduling request configurations, or a time period associated with the preferred set of scheduling request configurations, or both, where receiving the control signaling is based on the assistance information.

Figure 11:
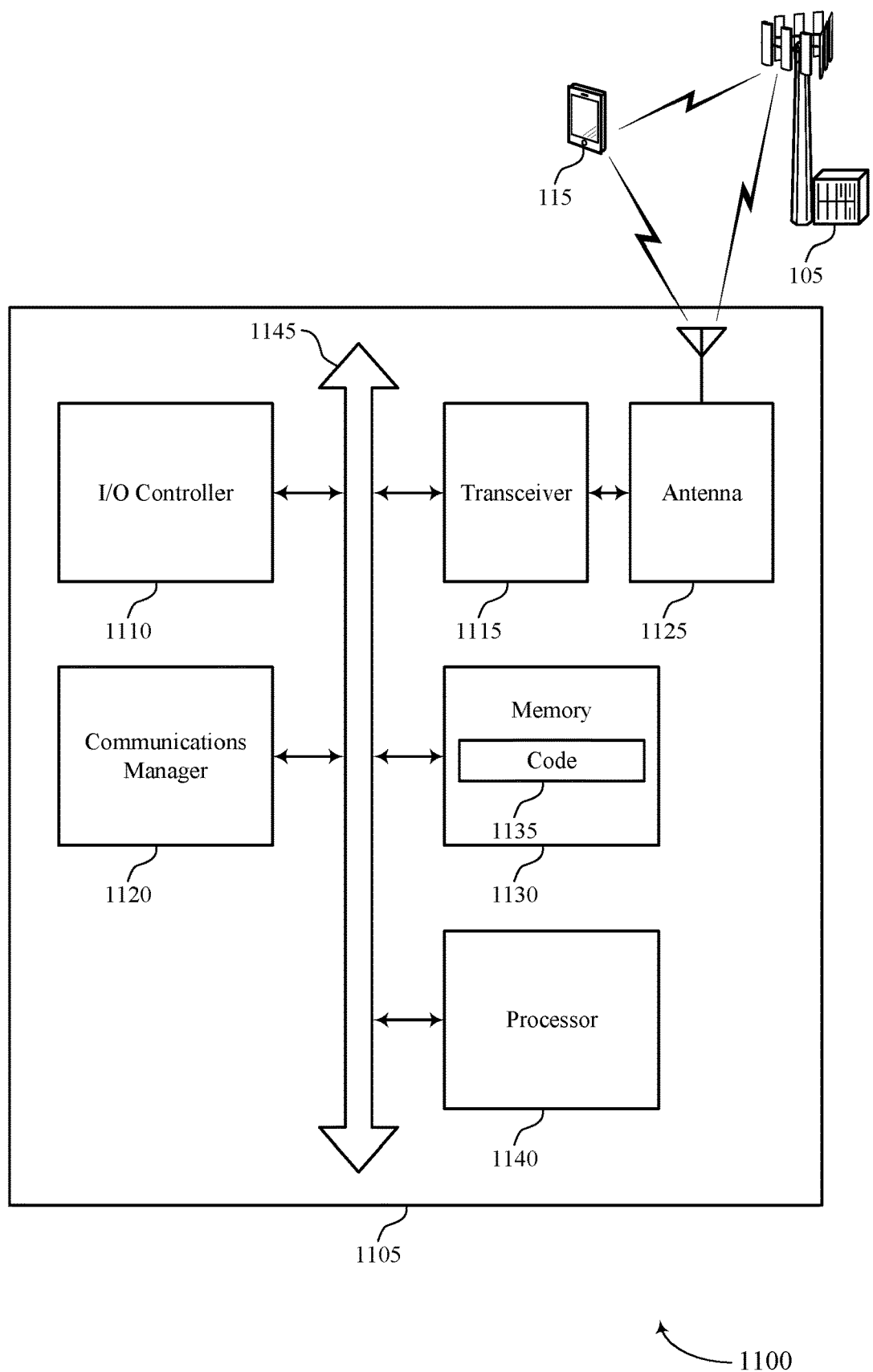
FIG. 11 shows a diagram of a system including a device that supports enhanced scheduling request configurations for wireless communications in accordance with one or more aspects of the present disclosure.

FIG. 11 shows a diagram of a system 1100 including a device 1105 that supports enhanced scheduling request configurations for wireless communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting enhanced scheduling request configurations for wireless communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for obtaining, at a PDCP layer of the UE, information associated with a data packet for transmission by the UE. The communications manager 1120 may be configured as or otherwise support a means for transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The communications manager 1120 may be configured as or otherwise support a means for receiving scheduling information for communications by the UE, the scheduling information based on the elapsed time period, or whether the data packet includes the final packet of the set of data packets, or both.

By including or configuring the communications manager 1120 in accordance with examples as described herein, the device 1105 may support techniques for improved communication reliability, reduced latency, reduced power consumption, more efficient utilization of communication resources, improved coordination between devices, and longer battery life, among other advantages.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of enhanced scheduling request configurations for wireless communications as described herein, or the processor 1140 and the memory 1130 may be otherwise configured to perform or support such operations.

Figure 12:
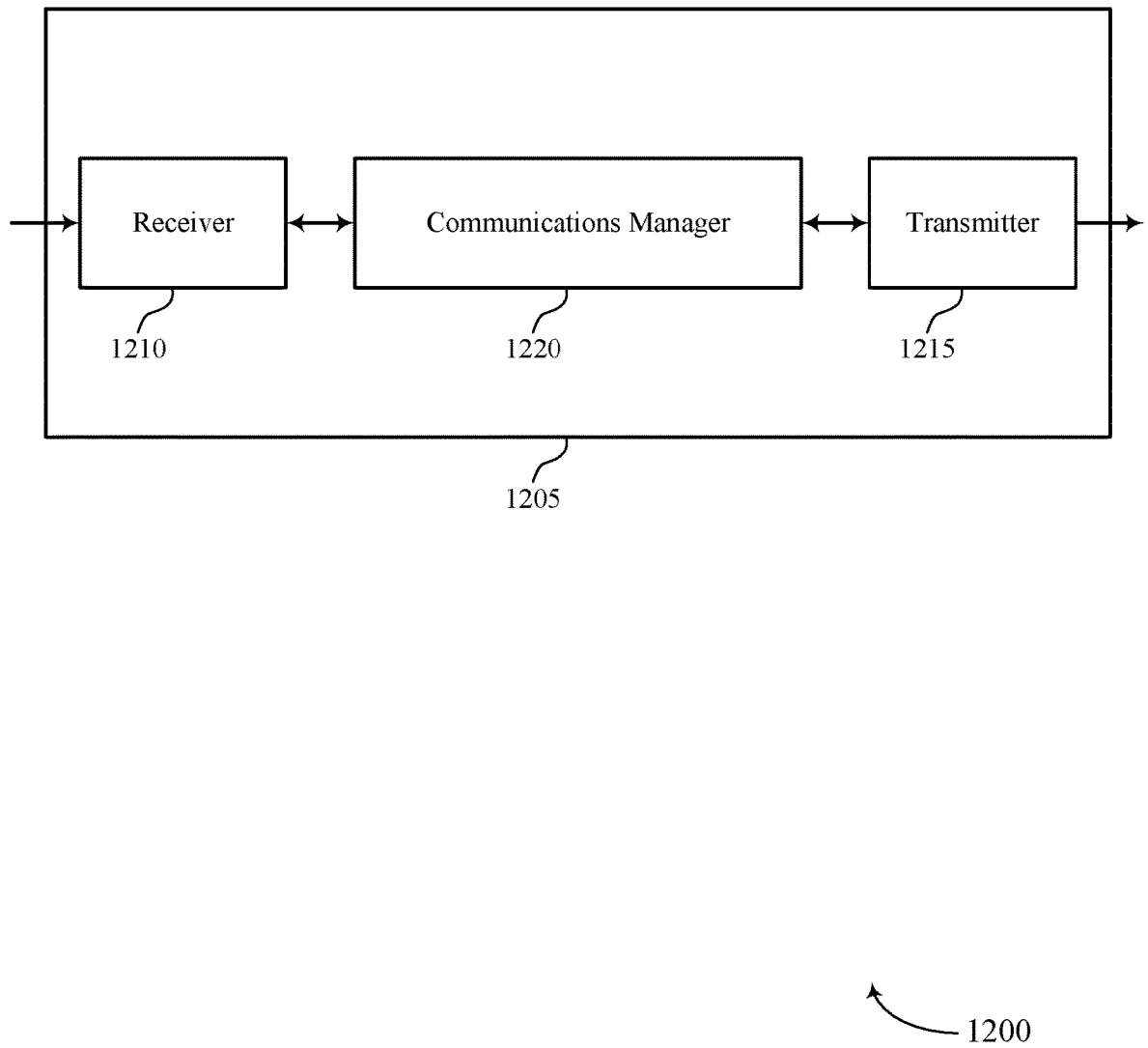
FIGS. 12 and 13 show block diagrams of devices that support enhanced scheduling request configurations for wireless communications in accordance with one or more aspects of the present disclosure.

FIG. 12 shows a block diagram 1200 of a device 1205 that supports enhanced scheduling request configurations for wireless communications in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of enhanced scheduling request configurations for wireless communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for receiving a scheduling request that indicates information regarding an elapsed time period between information associated with a data packet being obtained at a PDCP layer of a UE and the scheduling request, or whether the data packet includes a final packet of a set of data packets, or both. The communications manager 1220 may be configured as or otherwise support a means for determining scheduling information for uplink communications by the UE based on the elapsed time period, or whether the data packet includes the final packet of the set of data packets, or both. The communications manager 1220 may be configured as or otherwise support a means for transmitting the scheduling information for the uplink communications by the UE.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources, among other advantages.

Figure 13:
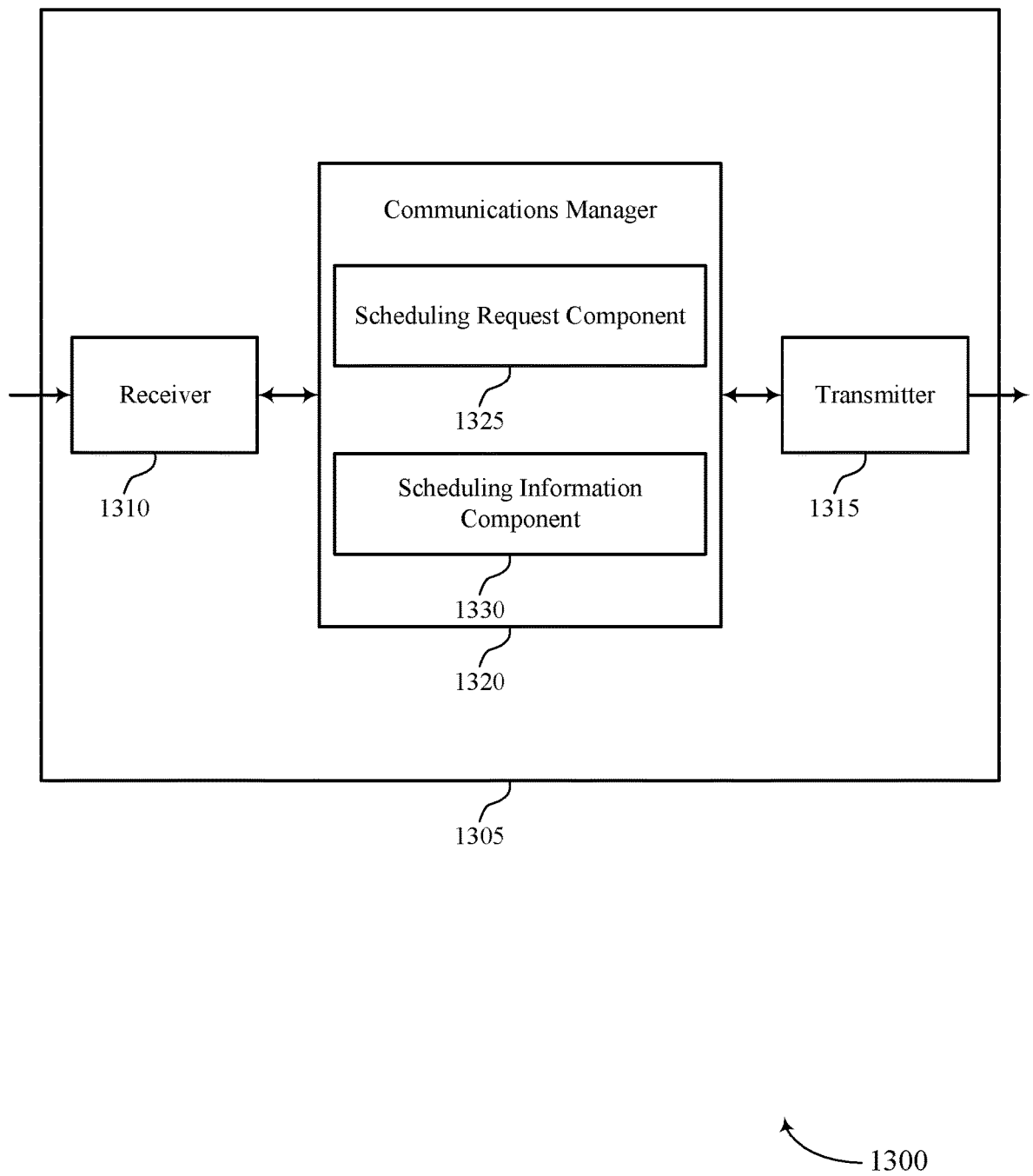

FIG. 13 shows a block diagram 1300 of a device 1305 that supports enhanced scheduling request configurations for wireless communications in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of enhanced scheduling request configurations for wireless communications as described herein. For example, the communications manager 1320 may include a scheduling request component 1325 a scheduling information component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The scheduling request component 1325 may be configured as or otherwise support a means for receiving a scheduling request that indicates information regarding an elapsed time period between information associated with a data packet being obtained at a PDCP layer of a UE and the scheduling request, or whether the data packet includes a final packet of a set of data packets, or both. The scheduling information component 1330 may be configured as or otherwise support a means for determining scheduling information for uplink communications by the UE based on the elapsed time period, or whether the data packet includes the final packet of the set of data packets, or both. The scheduling information component 1330 may be configured as or otherwise support a means for transmitting the scheduling information for the uplink communications by the UE.

Figure 14:
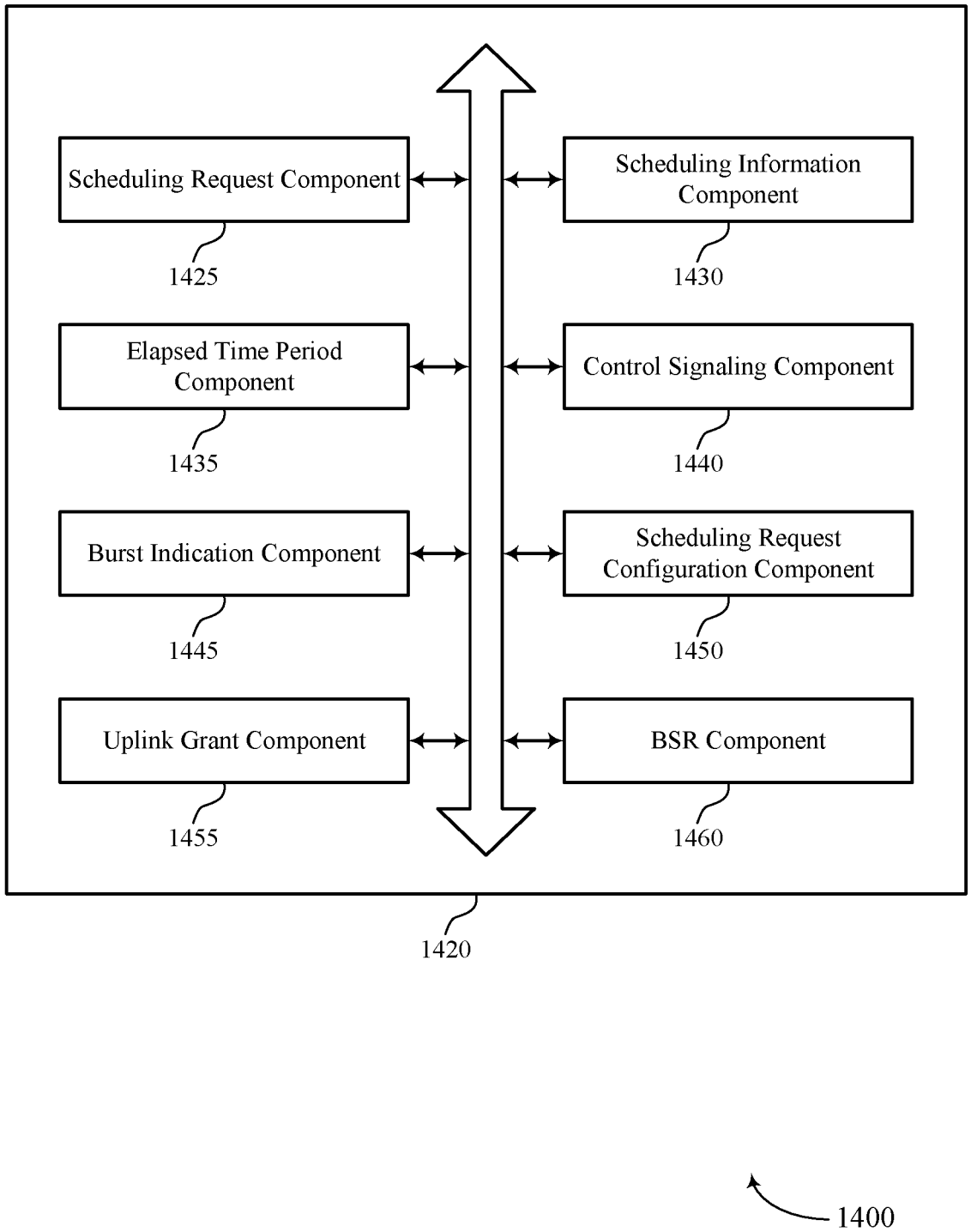
FIG. 14 shows a block diagram of a communications manager that supports enhanced scheduling request configurations for wireless communications in accordance with one or more aspects of the present disclosure.

FIG. 14 shows a block diagram 1400 of a communications manager 1420 that supports enhanced scheduling request configurations for wireless communications in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of enhanced scheduling request configurations for wireless communications as described herein. For example, the communications manager 1420 may include a scheduling request component 1425, a scheduling information component 1430, an elapsed time period component 1435, a control signaling component 1440, a burst indication component 1445, a scheduling request configuration component 1450, an uplink grant component 1455, an BSR component 1460, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The scheduling request component 1425 may be configured as or otherwise support a means for receiving a scheduling request that indicates information regarding an elapsed time period between information associated with a data packet being obtained at a PDCP layer of a UE and the scheduling request, or whether the data packet includes a final packet of a set of data packets, or both. The scheduling information component 1430 may be configured as or otherwise support a means for determining scheduling information for uplink communications by the UE based on the elapsed time period, or whether the data packet includes the final packet of the set of data packets, or both. In some examples, the scheduling information component 1430 may be configured as or otherwise support a means for transmitting the scheduling information for the uplink communications by the UE.

In some examples, to support receiving the scheduling request, the elapsed time period component 1435 may be configured as or otherwise support a means for receiving, within the scheduling request, a bit that indicates a request for an uplink grant and whether the elapsed time period is greater than a threshold time period, where the bit having a first value indicates that the elapsed time period is greater than the threshold time period and the bit having a second value indicates that the elapsed time period is less than the threshold time period.

In some examples, the bit may have the first value, and, to support transmitting the scheduling information, the uplink grant component 1455 may be configured as or otherwise support a means for transmitting the uplink grant for the UE, where a timing associated with the uplink grant is based on the bit of the scheduling request having the first value.

In some examples, the bit may have the second value, and the BSR component 1460 may be configured as or otherwise support a means for receiving a BSR after receiving the scheduling request based on the elapsed time period being less than the threshold time period, where determining the scheduling information is based on the bit having the second value and the BSR, and where transmitting the scheduling information includes. In some examples, the bit has the second value, and the uplink grant component 1455 may be configured as or otherwise support a means for transmitting, the uplink grant for the UE, where a timing associated with the uplink grant is based on the bit of the scheduling request having the second value.

In some examples, the control signaling component 1440 may be configured as or otherwise support a means for transmitting control signaling that indicates a set of multiple scheduling request configurations each associated with a respective logical channel, where a first scheduling request configuration of the set of multiple scheduling request configurations is for indicating that the elapsed time period is less than a threshold time period and a second scheduling request configuration of the set of multiple scheduling request configurations is for indicating that the elapsed time period is greater than or equal to the threshold time period, and where the scheduling request is in accordance with one of the first scheduling request configuration or the second scheduling request configuration.

In some examples, to support receiving the scheduling request, the elapsed time period component 1435 may be configured as or otherwise support a means for receiving, via the scheduling request, an index value that points to a value or range of the elapsed time period from among a set of elapsed time period values or ranges, where the scheduling request includes two or more bits for indicating the index value.

In some examples, to support receiving the scheduling request, the burst indication component 1445 may be configured as or otherwise support a means for receiving, within the scheduling request, a bit that indicates a request for an uplink grant and whether the data packet includes the final packet of the set of data packets, where the bit having a first value indicates that the data packet includes the final packet of the set of data packets and the bit having a second value indicates that the data packet is not the final packet of the set of data packets.

In some examples, to support transmitting the scheduling information, the scheduling information component 1430 may be configured as or otherwise support a means for transmitting a connected discontinuous reception command based on the scheduling request indicating that the data packet includes the final packet of the set of data packets, where the connected discontinuous reception command instructs the UE to enter a sleep mode.

In some examples, the control signaling component 1440 may be configured as or otherwise support a means for transmitting RRC signaling that configures the scheduling request to indicate the information regarding the elapsed time period, or to indicate whether the data packet includes the final packet of the set of data packets, or both, where content of the scheduling request is based on the RRC signaling.

In some examples, the scheduling request configuration component 1450 may be configured as or otherwise support a means for transmitting first control signaling that configures a set of multiple sets of scheduling request configurations, where each set of scheduling request configurations of the set of multiple sets is associated with a respective logical channel and one or more respective scheduling request timing parameters. In some examples, the control signaling component 1440 may be configured as or otherwise support a means for transmitting second control signaling that activates a first set of scheduling request configurations from among the set of multiple sets of scheduling request configurations for a time period associated with a burst transmission by the UE, where the set of data packets includes a first burst transmission. In some examples, the control signaling component 1440 may be configured as or otherwise support a means for transmitting third control signaling that activates a second set of scheduling request configurations from among the set of multiple sets of scheduling request configurations for a second time period between burst transmissions by the UE.

In some examples, the scheduling request configuration component 1450 may be configured as or otherwise support a means for receiving assistance information that indicates a preferred set of scheduling request configurations, or a time period associated with the preferred set of scheduling request configurations, or both, where transmitting the first control signaling is based on the assistance information.

Figure 15:
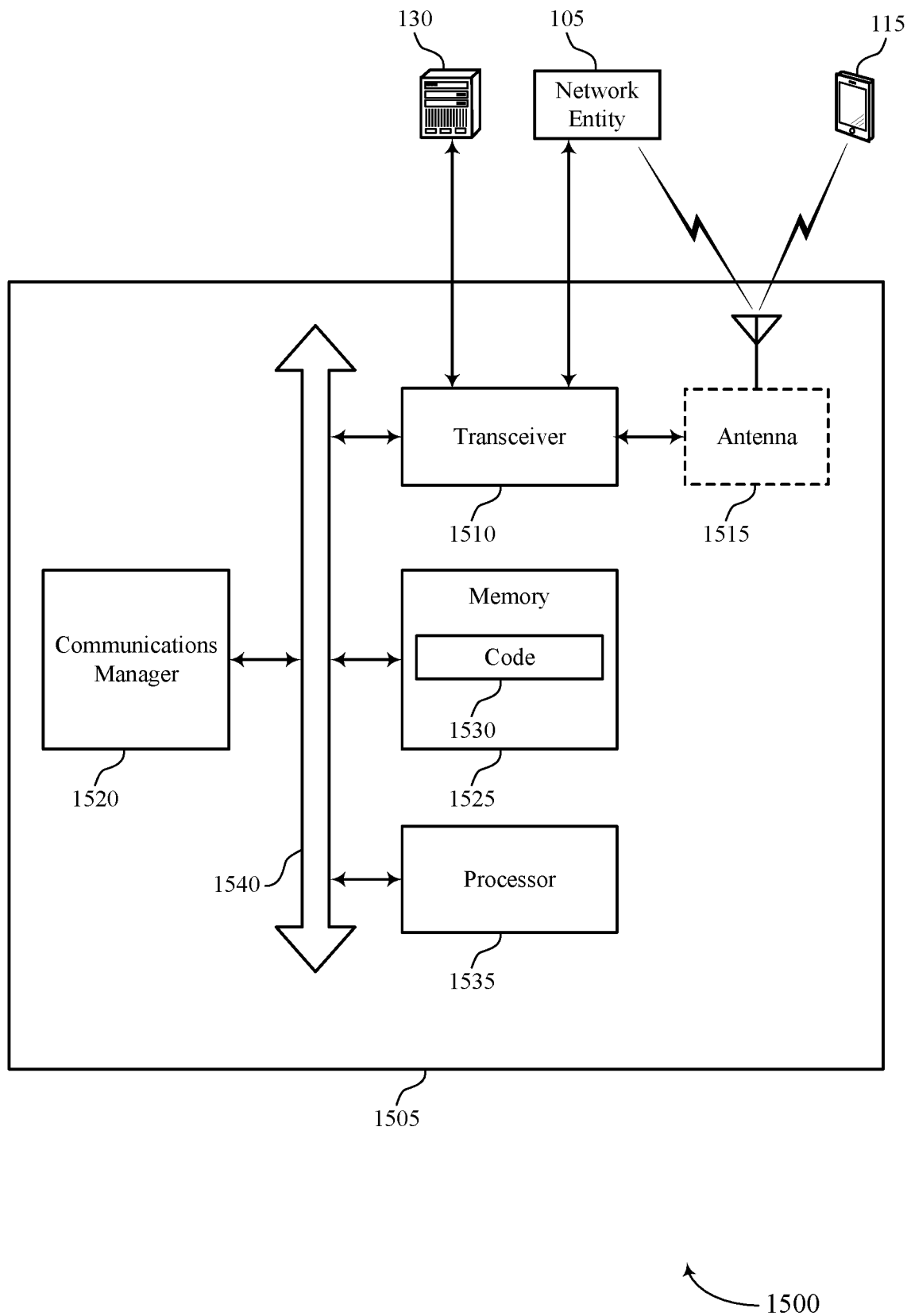
FIG. 15 shows a diagram of a system including a device that supports enhanced scheduling request configurations for wireless communications in accordance with one or more aspects of the present disclosure.

FIG. 15 shows a diagram of a system 1500 including a device 1505 that supports enhanced scheduling request configurations for wireless communications in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting enhanced scheduling request configurations for wireless communications). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505 and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105 and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for receiving a scheduling request that indicates information regarding an elapsed time period between information associated with a data packet being obtained at a PDCP layer of a UE and the scheduling request, or whether the data packet includes a final packet of a set of data packets, or both. The communications manager 1520 may be configured as or otherwise support a means for determining scheduling information for uplink communications by the UE based on the elapsed time period, or whether the data packet includes the final packet of the set of data packets, or both. The communications manager 1520 may be configured as or otherwise support a means for transmitting the scheduling information for the uplink communications by the UE.

By including or configuring the communications manager 1520 in accordance with examples as described herein, the device 1505 may support techniques for improved communication reliability, reduced latency, reduced power consumption, more efficient utilization of communication resources, improved coordination between devices, and longer battery life, among other advantages.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. For example, the communications manager 1520 may be configured to receive or transmit messages or other signaling as described herein via the transceiver 1510. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of enhanced scheduling request configurations for wireless communications as described herein, or the processor 1535 and the memory 1525 may be otherwise configured to perform or support such operations.

Figure 16:
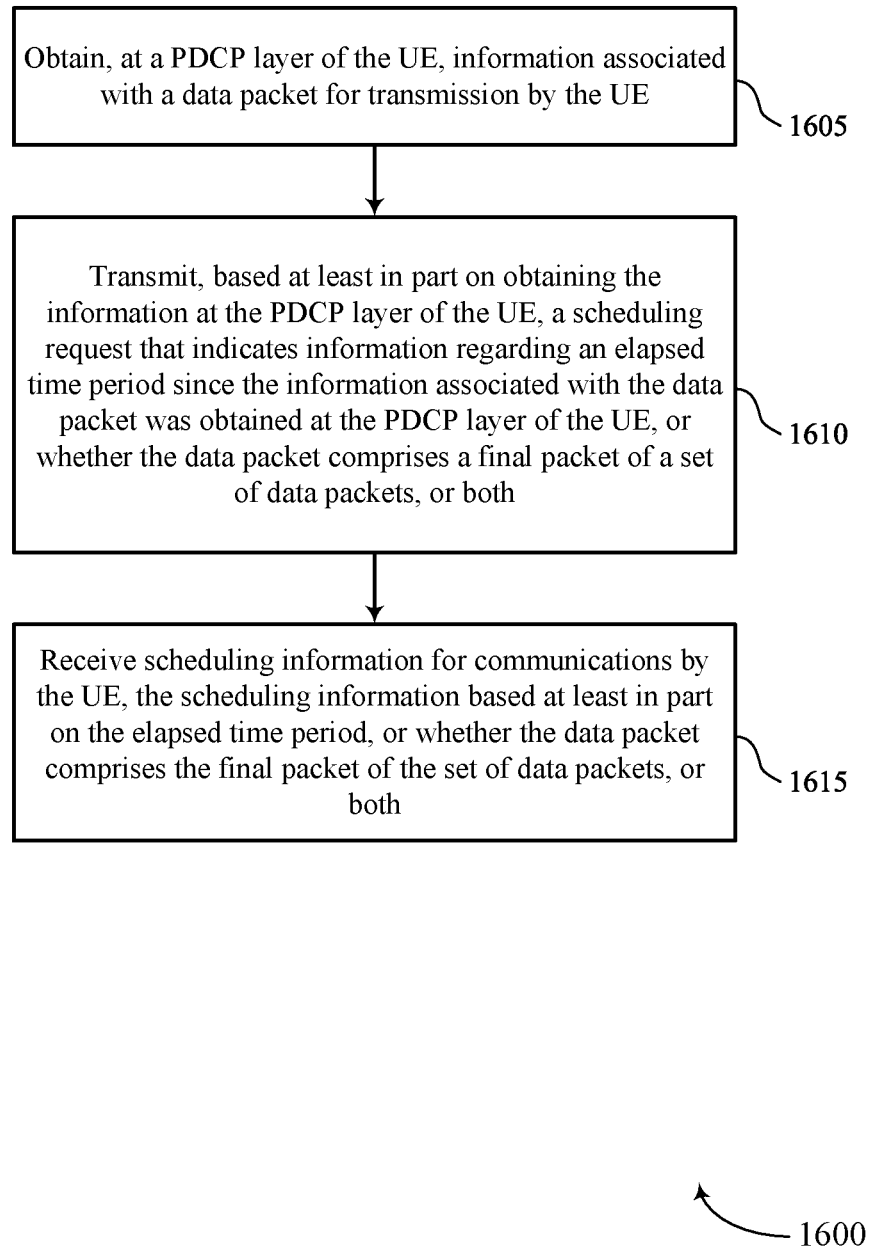
FIGS. 16 through 20 show flowcharts illustrating methods that support enhanced scheduling request configurations for wireless communications in accordance with one or more aspects of the present disclosure.

FIG. 16 shows a flowchart illustrating a method 1600 that supports enhanced scheduling request configurations for wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include obtaining, at a PDCP layer of the UE, information associated with a data packet for transmission by the UE. The operations of 1605 may be performed in accordance with examples as disclosed herein. In some examples, aspects of the operations of 1605 may be performed by a PDCP manager 1025 as described with reference to FIG. 10. Additionally. or alternatively, means for performing 1605 may, but not necessarily, include, for example, antenna 1125, transceiver 1115, communications manager 1120, memory 1130 (including code 1135), processor 1140 and/or bus 1145.

At 1610, the method may include transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The operations of 1610 may be performed in accordance with examples as disclosed herein. In some examples, aspects of the operations of 1610 may be performed by a scheduling request component 1030 as described with reference to FIG. 10. Additionally. or alternatively, means for performing 1610 may, but not necessarily, include, for example, antenna 1125, transceiver 1115, communications manager 1120, memory 1130 (including code 1135), processor 1140 and/or bus 1145.

At 1615, the method may include receiving scheduling information for communications by the UE, the scheduling information based on the elapsed time period, or whether the data packet includes the final packet of the set of data packets, or both. The operations of 1615 may be performed in accordance with examples as disclosed herein. In some examples, aspects of the operations of 1615 may be performed by a scheduling information component 1035 as described with reference to FIG. 10. Additionally. or alternatively, means for performing 1615 may, but not necessarily, include, for example, antenna 1125, transceiver 1115, communications manager 1120, memory 1130 (including code 1135), processor 1140 and/or bus 1145.

Figure 17:
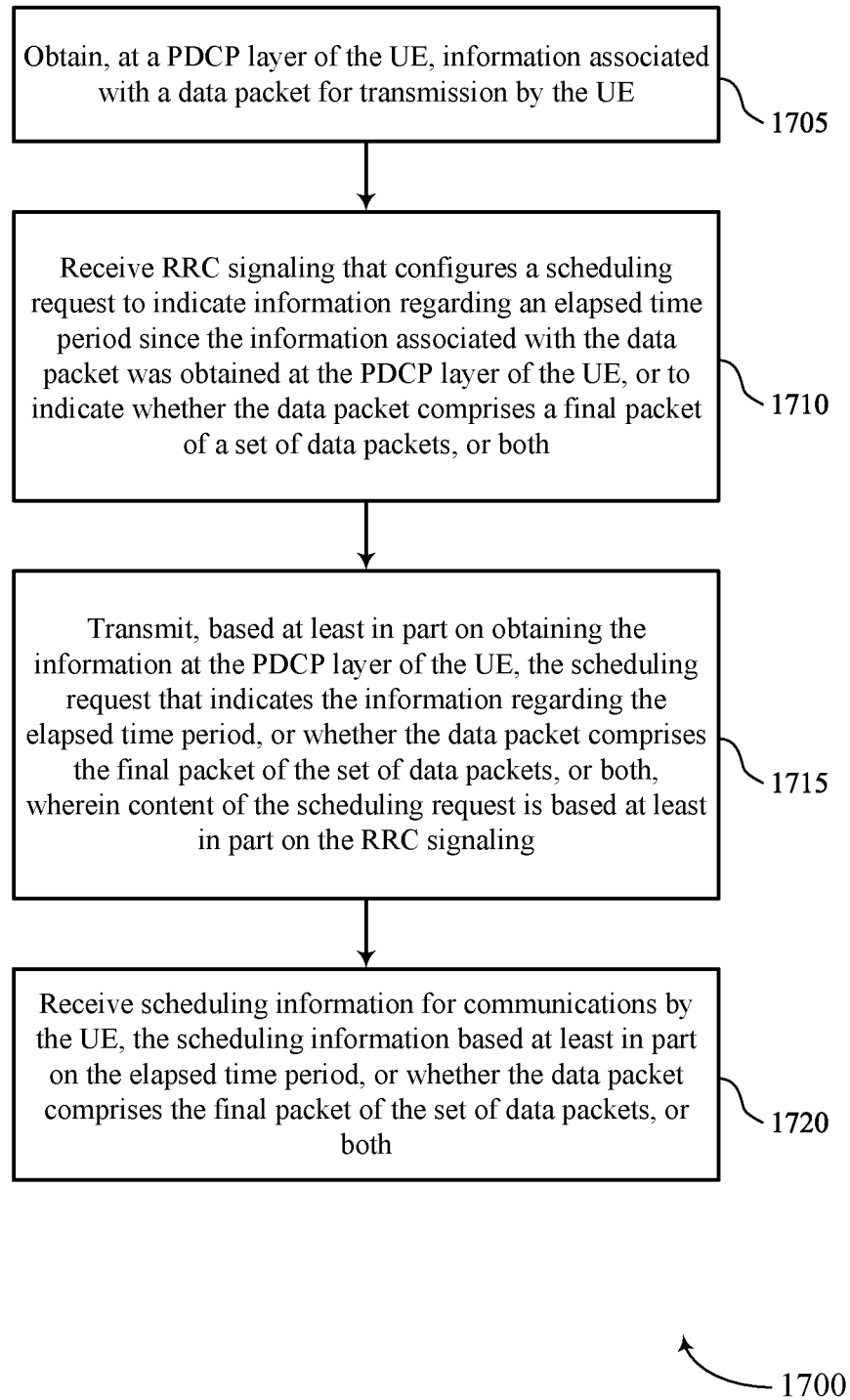

FIG. 17 shows a flowchart illustrating a method 1700 that supports enhanced scheduling request configurations for wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include obtaining, at a PDCP layer of the UE, information associated with a data packet for transmission by the UE. The operations of 1705 may be performed in accordance with examples as disclosed herein. In some examples, aspects of the operations of 1705 may be performed by a PDCP manager 1025 as described with reference to FIG. 10. Additionally. or alternatively, means for performing 1705 may, but not necessarily, include, for example, antenna 1125, transceiver 1115, communications manager 1120, memory 1130 (including code 1135), processor 1140 and/or bus 1145.

At 1710, the method may include receiving RRC signaling that configures a scheduling request to indicate information regarding an elapsed time period since the information associated with the data packet was obtained at the PDCP layer of the UE, or to indicate whether the data packet comprises a final packet of a set of data packets, or both. The operations of 1710 may be performed in accordance with examples as disclosed herein. In some examples, aspects of the operations of 1710 may be performed by a control signaling component 1045 as described with reference to FIG. 10. Additionally. or alternatively, means for performing 1710 may, but not necessarily, include, for example, antenna 1125, transceiver 1115, communications manager 1120, memory 1130 (including code 1135), processor 1140 and/or bus 1145.

At 1715, the method may include transmitting, based on obtaining the information at the PDCP layer of the UE, the scheduling request that indicates the information regarding the elapsed time period, or whether the data packet includes the final packet of the set of data packets, or both, wherein content of the scheduling request is based on the RRC signaling. The operations of 1715 may be performed in accordance with examples as disclosed herein. In some examples, aspects of the operations of 1715 may be performed by a scheduling request component 1030 as described with reference to FIG. 10. Additionally. or alternatively, means for performing 1715 may, but not necessarily, include, for example, antenna 1125, transceiver 1115, communications manager 1120, memory 1130 (including code 1135), processor 1140 and/or bus 1145.

At 1720, the method may include receiving scheduling information for communications by the UE, the scheduling information based on the elapsed time period, or whether the data packet includes the final packet of the set of data packets, or both. The operations of 1720 may be performed in accordance with examples as disclosed herein. In some examples, aspects of the operations of 1720 may be performed by a scheduling information component 1035 as described with reference to FIG. 10. Additionally. or alternatively, means for performing 1720 may, but not necessarily, include, for example, antenna 1125, transceiver 1115, communications manager 1120, memory 1130 (including code 1135), processor 1140 and/or bus 1145.

Figure 18:
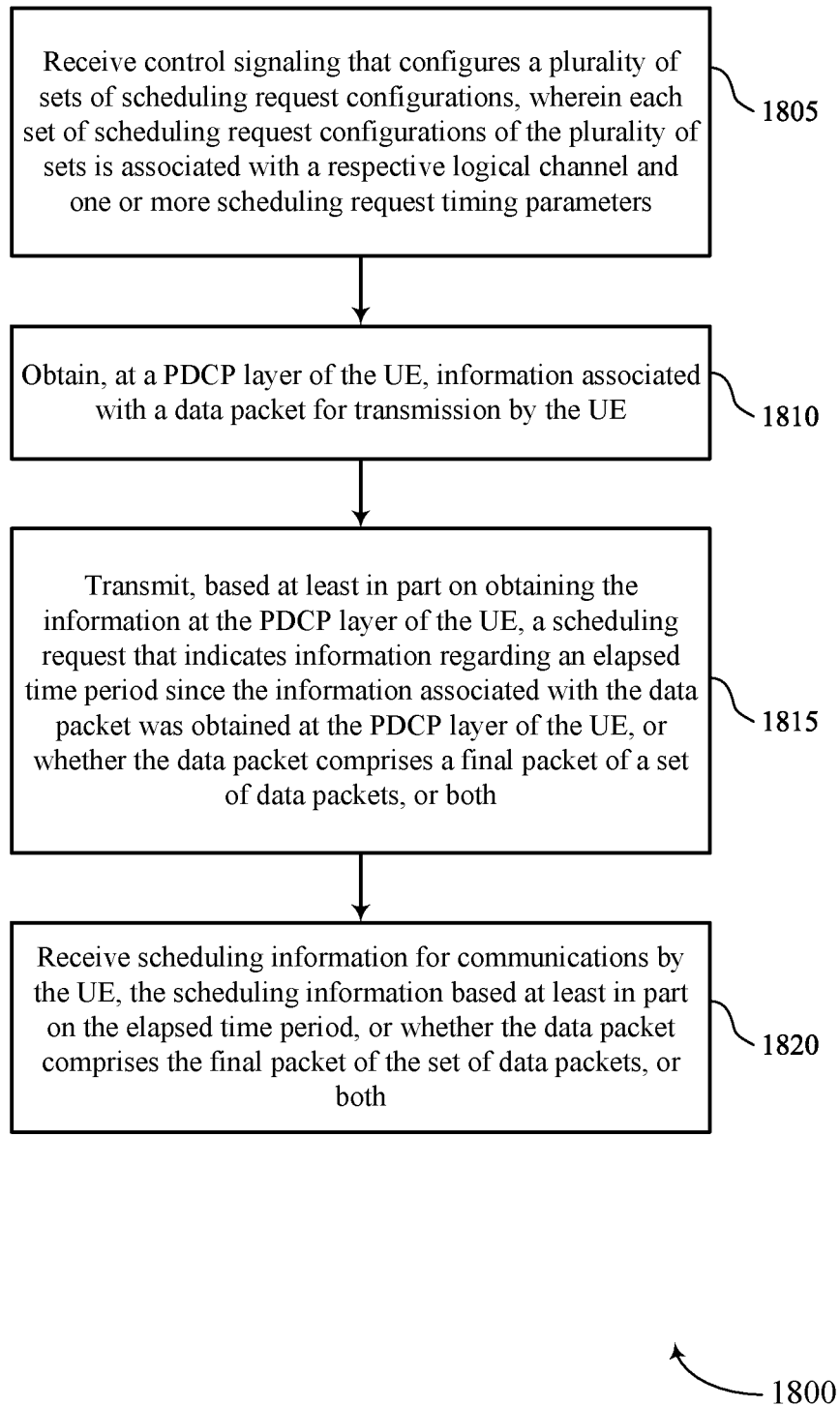

FIG. 18 shows a flowchart illustrating a method 1800 that supports enhanced scheduling request configurations for wireless communications in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving control signaling that configures a set of multiple sets of scheduling request configurations, where each set of scheduling request configurations of the set of multiple sets is associated with a respective logical channel and one or more respective scheduling request timing parameters. The operations of 1805 may be performed in accordance with examples as disclosed herein. In some examples, aspects of the operations of 1805 may be performed by a scheduling request configuration component 1060 as described with reference to FIG. 10. Additionally. or alternatively, means for performing 1805 may, but not necessarily, include, for example, antenna 1125, transceiver 1115, communications manager 1120, memory 1130 (including code 1135), processor 1140 and/or bus 1145.

At 1810, the method may include obtaining, at a PDCP layer of the UE, information associated with a data packet for transmission by the UE. The operations of 1810 may be performed in accordance with examples as disclosed herein. In some examples, aspects of the operations of 1810 may be performed by a PDCP manager 1025 as described with reference to FIG. 10. Additionally. or alternatively, means for performing 1810 may, but not necessarily, include, for example, antenna 1125, transceiver 1115, communications manager 1120, memory 1130 (including code 1135), processor 1140 and/or bus 1145.

At 1815, the method may include transmitting, based on obtaining the information at the PDCP layer of the UE, a scheduling request that indicates information regarding an elapsed time period since the information associated with the data packet was obtained at the PDCP layer of the UE, or whether the data packet includes a final packet of a set of data packets, or both. The operations of 1815 may be performed in accordance with examples as disclosed herein. In some examples, aspects of the operations of 1815 may be performed by a scheduling request component 1030 as described with reference to FIG. 10. Additionally. or alternatively, means for performing 1815 may, but not necessarily, include, for example, antenna 1125, transceiver 1115, communications manager 1120, memory 1130 (including code 1135), processor 1140 and/or bus 1145.

At 1820, the method may include receiving scheduling information for communications by the UE, the scheduling information based on the elapsed time period, or whether the data packet includes the final packet of the set of data packets, or both. The operations of 1820 may be performed in accordance with examples as disclosed herein. In some examples, aspects of the operations of 1820 may be performed by a scheduling information component 1035 as described with reference to FIG. 10. Additionally. or alternatively, means for performing 1820 may, but not necessarily, include, for example, antenna 1125, transceiver 1115, communications manager 1120, memory 1130 (including code 1135), processor 1140 and/or bus 1145.

Figure 19:
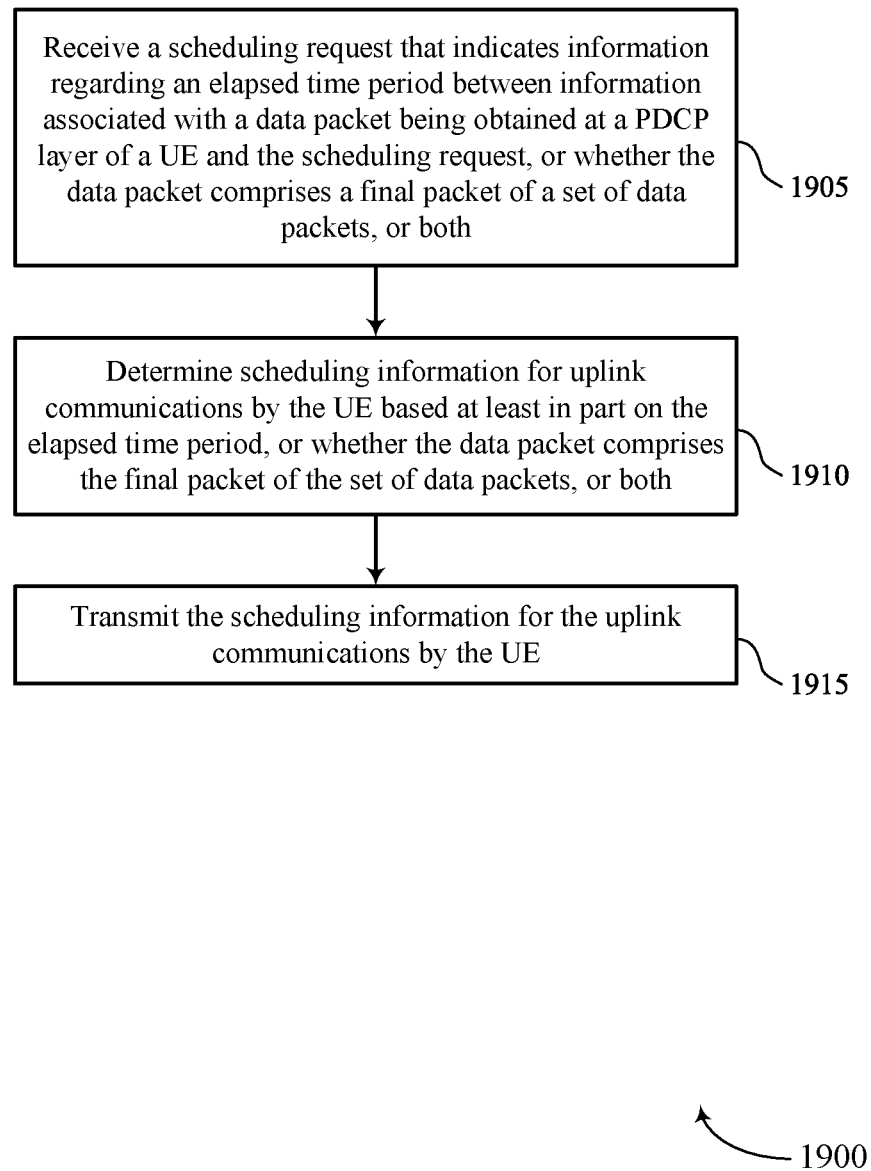

FIG. 19 shows a flowchart illustrating a method 1900 that supports enhanced scheduling request configurations for wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include receiving a scheduling request that indicates information regarding an elapsed time period between information associated with a data packet being obtained at a PDCP layer of a UE and the scheduling request, or whether the data packet includes a final packet of a set of data packets, or both. The operations of 1905 may be performed in accordance with examples as disclosed herein. In some examples, aspects of the operations of 1905 may be performed by a scheduling request component 1425 as described with reference to FIG. 14. Additionally. or alternatively, means for performing 1905 may, but not necessarily, include, for example, antenna 1515, transceiver 1510, communications manager 1520, memory 1525 (including code 1530), processor 1535 and/or bus 1540.

At 1910, the method may include determining scheduling information for uplink communications by the UE based on the elapsed time period, or whether the data packet includes the final packet of the set of data packets, or both. The operations of 1910 may be performed in accordance with examples as disclosed herein. In some examples, aspects of the operations of 1910 may be performed by a scheduling information component 1430 as described with reference to FIG. 14. Additionally. or alternatively, means for performing 1910 may, but not necessarily, include, for example, antenna 1515, transceiver 1510, communications manager 1520, memory 1525 (including code 1530), processor 1535 and/or bus 1540.

At 1915, the method may include transmitting the scheduling information for the uplink communications by the UE. The operations of 1915 may be performed in accordance with examples as disclosed herein. In some examples, aspects of the operations of 1915 may be performed by a scheduling information component 1430 as described with reference to FIG. 14. Additionally. or alternatively, means for performing 1915 may, but not necessarily, include, for example, antenna 1515, transceiver 1510, communications manager 1520, memory 1525 (including code 1530), processor 1535 and/or bus 1540.

Figure 20:
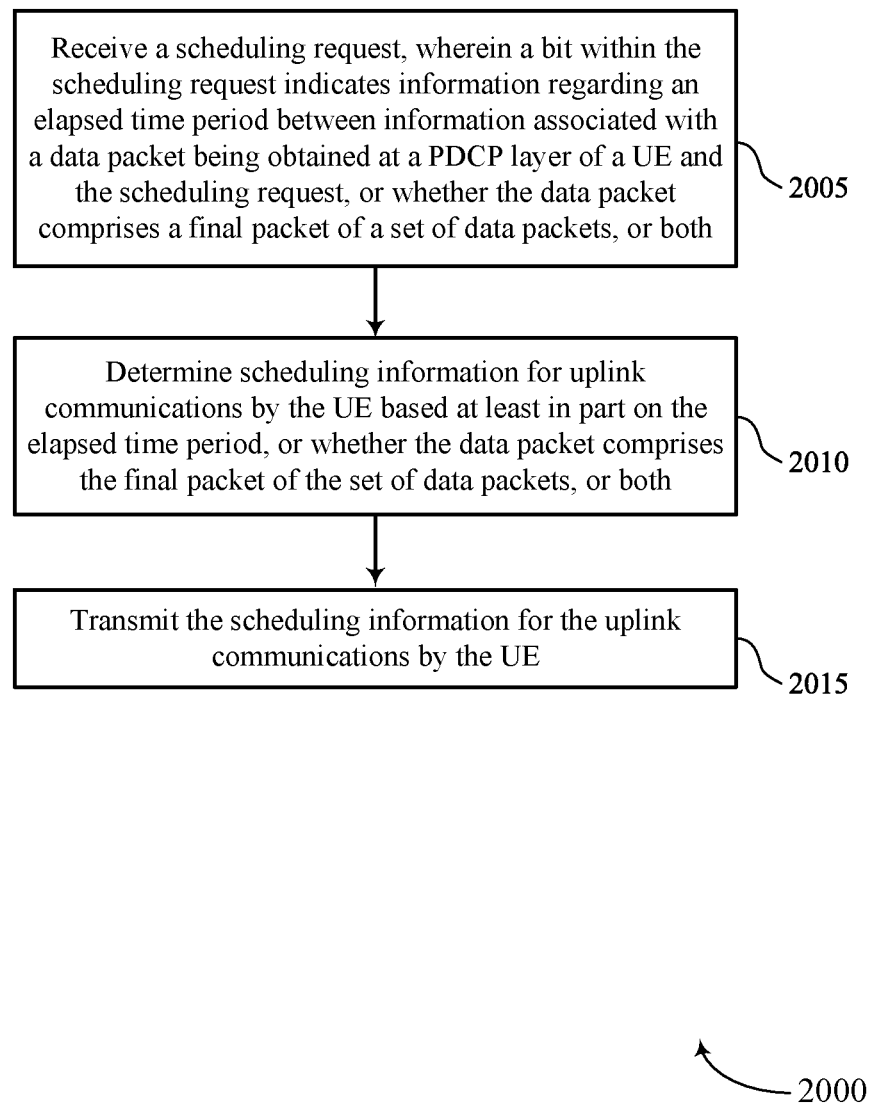

FIG. 20 shows a flowchart illustrating a method 2000 that supports enhanced scheduling request configurations for wireless communications in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include receiving a scheduling request, wherein a bit within the scheduling request indicates information regarding an elapsed time period between information associated with a data packet being obtained at a PDCP layer of a UE and the scheduling request, or whether the data packet includes a final packet of a set of data packets, or both. The operations of 2005 may be performed in accordance with examples as disclosed herein. In some examples, aspects of the operations of 2005 may be performed by a scheduling request component 1425 as described with reference to FIG. 14. Additionally. or alternatively, means for performing 2005 may, but not necessarily, include, for example, antenna 1515, transceiver 1510, communications manager 1520, memory 1525 (including code 1530), processor 1535 and/or bus 1540.

At 2010, the method may include determining scheduling information for uplink communications by the UE based on the elapsed time period, or whether the data packet includes the final packet of the set of data packets, or both. The operations of 2010 may be performed in accordance with examples as disclosed herein. In some examples, aspects of the operations of 2010 may be performed by a scheduling information component 1430 as described with reference to FIG. 14. Additionally. or alternatively, means for performing 2010 may, but not necessarily, include, for example, antenna 1515, transceiver 1510, communications manager 1520, memory 1525 (including code 1530), processor 1535 and/or bus 1540.

At 2015, the method may include transmitting the scheduling information for the uplink communications by the UE. The operations of 2015 may be performed in accordance with examples as disclosed herein. In some examples, aspects of the operations of 2015 may be performed by a scheduling information component 1430 as described with reference to FIG. 14. Additionally. or alternatively, means for performing 2015 may, but not necessarily, include, for example, antenna 1515, transceiver 1510, communications manager 1520, memory 1525 (including code 1530), processor 1535 and/or bus 1540.

The following provides an overview of aspects of the present disclosure:

Aspect 1: A method for wireless communication at a UE, comprising: transmitting a scheduling request that indicates information regarding an elapsed time period since information associated with a data packet was obtained at a PDCP layer of the UE, or whether the data packet comprises a final packet of a set of data packets, or both; and receiving scheduling information for communications by the UE, the scheduling information based at least in part on the elapsed time period, or whether the data packet comprises the final packet of the set of data packets, or both.

Aspect 2: The method of aspect 1, wherein transmitting the scheduling request comprises: transmitting, within the scheduling request, a bit that indicates a request for an uplink grant and whether the elapsed time period is greater than a threshold time period, wherein the bit having a first value indicates that the elapsed time period is greater than the threshold time period and the bit having a second value indicates that the elapsed time period is less than the threshold time period.

Aspect 3: The method of aspect 2, wherein the bit has the first value, and wherein receiving the scheduling information comprises: receiving the uplink grant, wherein a timing associated with the uplink grant is based at least in part on the bit of the scheduling request having the first value.

Aspect 4: The method of aspect 2, wherein the bit has the second value, the method further comprising: transmitting a BSR after transmitting the scheduling request based at least in part on the elapsed time period being less than the threshold time period, wherein receiving the scheduling information comprises: receiving the uplink grant in response to the BSR, wherein receiving the scheduling information after transmitting the BSR is based at least in part on the bit of the scheduling request having the second value.

Aspect 5: The method of aspect 1, further comprising: receiving control signaling that indicates a plurality of scheduling request configurations each associated with a respective logical channel; and selecting, based at least in part on the elapsed time period and a threshold time period, a scheduling request configuration from the plurality of scheduling request configurations for transmitting the scheduling request, wherein a first scheduling request configuration of the plurality of scheduling request configurations is for indicating that the elapsed time period is less than the threshold time period and a second scheduling request configuration of the plurality of scheduling request configurations is for indicating that the elapsed time period is greater than or equal to the threshold time period.

Aspect 6: The method of any of aspects 1 through 5, further comprising: generating the scheduling request to indicate the information regarding the elapsed time period based at least in part on a quality of service associated with a logical channel corresponding to the data packet.

Aspect 7: The method of any of aspects 1 through 6, further comprising: determining that the elapsed time period is a longest time period of a plurality of elapsed time periods associated with a plurality of data packets for transmission by the UE; and selecting the data packet from among the plurality of data packets based at least in part on the elapsed time period being the longest time period, wherein the scheduling request indicates the information regarding the elapsed time period for the data packet based at least in part on the data packet being selected from among the plurality of data packets.

Aspect 8: The method of any of aspects 1 and 5 through 7, wherein the scheduling request comprises two or more bits configured to indicate the information regarding the elapsed time period, information regarding a portion of a PDB that is remaining for the data packet after the elapsed time period, or both.

Aspect 9: The method of aspect 8, further comprising: transmitting, via the two or more bits of the scheduling request, an index value that points to a value or range of the elapsed time period from among a set of elapsed time period values or ranges.

Aspect 10: The method of aspect 1, wherein transmitting the scheduling request comprises: transmitting, within the scheduling request, a bit that indicates a request for an uplink grant and whether the data packet comprises the final packet of the set of data packets, wherein the bit having a first value indicates that the data packet comprises the final packet of the set of data packets and the bit having a second value indicates that the data packet is not the final packet of the set of data packets.

Aspect 11: The method of any of aspects 1 through 10, wherein receiving the scheduling information comprises: receiving, via the scheduling information, a CDRX command based at least in part on the scheduling request indicating that the data packet comprises the final packet of the set of data packets; and entering a sleep mode based at least in part on the CDRX command.

Aspect 12: The method of any of aspects 1 through 11, further comprising: receiving RRC signaling that configures the scheduling request to indicate the information regarding the elapsed time period, or to indicate whether the data packet comprises the final packet of the set of data packets, or both, wherein content of the scheduling request is based at least in part on the RRC signaling.

Aspect 13: The method of any of aspects 1 through 12, further comprising: receiving control signaling that configures a plurality of sets of scheduling request configurations, wherein each set of scheduling request configurations of the plurality of sets is associated with a respective logical channel and one or more respective scheduling request timing parameters.

Aspect 14: The method of aspect 13, further comprising: receiving second control signaling that activates a first set of scheduling request configurations from among the plurality of sets of scheduling request configurations for a time period associated with a burst transmission by the UE, wherein the set of data packets comprises a first burst transmission; and receiving third control signaling that activates a second set of scheduling request configurations from among the plurality of sets of scheduling request configurations for a second time period between burst transmissions by the UE.

Aspect 15: The method of any of aspects 13 through 14, wherein the scheduling request is transmitted in accordance with a first set of scheduling request configurations from among the plurality of sets of scheduling request configurations, wherein the set of data packets comprises an uplink burst transmission by the UE, and wherein the data packet comprises the final packet of the uplink burst transmission, the method further comprising: transmitting, after transmitting the scheduling request and based at least in part on the data packet comprising the final packet of the uplink burst transmission, a second scheduling request in accordance with a second set of scheduling request configurations from among the plurality of sets of scheduling request configurations.

Aspect 16: The method of any of aspects 13 through 15, wherein each scheduling request configuration of the plurality of sets of scheduling request configurations is associated with a respective BSR periodicity, a respective SRS configuration, a respective CSI reporting configuration, or any combination thereof.

Aspect 17: The method of any of aspects 13 through 16, further comprising: transmitting assistance information that indicates a preferred set of scheduling request configurations, or a time period associated with the preferred set of scheduling request configurations, or both, wherein receiving the control signaling is based at least in part on the assistance information.

Aspect 18: A method for wireless communication at a network entity, comprising: receiving a scheduling request that indicates information regarding an elapsed time period between information associated with a data packet being obtained at a PDCP layer of a UE and the scheduling request, or whether the data packet comprises a final packet of a set of data packets, or both; determining scheduling information for uplink communications by the UE based at least in part on the elapsed time period, or whether the data packet comprises the final packet of the set of data packets, or both; and transmitting the scheduling information for the uplink communications by the UE.

Aspect 19: The method of aspect 18, wherein receiving the scheduling request comprises: receiving, within the scheduling request, a bit that indicates a request for an uplink grant and whether the elapsed time period is greater than a threshold time period, wherein the bit having a first value indicates that the elapsed time period is greater than the threshold time period and the bit having a second value indicates that the elapsed time period is less than the threshold time period.

Aspect 20: The method of aspect 19, wherein the bit has the first value, and wherein transmitting the scheduling information comprises: transmitting the uplink grant for the UE, wherein a timing associated with the uplink grant is based at least in part on the bit of the scheduling request having the first value.

Aspect 21: The method of aspect 19, wherein the bit has the second value, the method further comprising: receiving a BSR after receiving the scheduling request based at least in part on the elapsed time period being less than the threshold time period, wherein determining the scheduling information is based at least in part on the bit having the second value and the BSR, and wherein transmitting the scheduling information comprises: transmitting, the uplink grant for the UE, wherein a timing associated with the uplink grant is based at least in part on the bit of the scheduling request having the second value.

Aspect 22: The method of aspect 18, further comprising: transmitting control signaling that indicates a plurality of scheduling request configurations each associated with a respective logical channel, wherein a first scheduling request configuration of the plurality of scheduling request configurations is for indicating that the elapsed time period is less than a threshold time period and a second scheduling request configuration of the plurality of scheduling request configurations is for indicating that the elapsed time period is greater than or equal to the threshold time period, and wherein the scheduling request is in accordance with one of the first scheduling request configuration or the second scheduling request configuration.

Aspect 23: The method of aspect 18, wherein receiving the scheduling request comprises: receiving, via the scheduling request, an index value that points to a value or range of the elapsed time period from among a set of elapsed time period values or ranges, wherein the scheduling request comprises two or more bits for indicating the index value.

Aspect 24: The method of aspect 18, wherein receiving the scheduling request comprises: receiving, within the scheduling request, a bit that indicates a request for an uplink grant and whether the data packet comprises the final packet of the set of data packets, wherein the bit having a first value indicates that the data packet comprises the final packet of the set of data packets and the bit having a second value indicates that the data packet is not the final packet of the set of data packets.

Aspect 25: The method of any of aspects 18 through 24, wherein transmitting the scheduling information comprises: transmitting a CDRX command based at least in part on the scheduling request indicating that the data packet comprises the final packet of the set of data packets, wherein the CDRX command instructs the UE to enter a sleep mode.

Aspect 26: The method of any of aspects 18 through 25, further comprising: transmitting RRC signaling that configures the scheduling request to indicate the information regarding the elapsed time period, or to indicate whether the data packet comprises the final packet of the set of data packets, or both, wherein content of the scheduling request is based at least in part on the RRC signaling.

Aspect 27: The method of any of aspects 18 through 26, further comprising: transmitting first control signaling that configures a plurality of sets of scheduling request configurations, wherein each set of scheduling request configurations of the plurality of sets is associated with a respective logical channel and one or more respective scheduling request timing parameters; transmitting second control signaling that activates a first set of scheduling request configurations from among the plurality of sets of scheduling request configurations for a time period associated with a burst transmission by the UE, wherein the set of data packets comprises a first burst transmission; and transmitting third control signaling that activates a second set of scheduling request configurations from among the plurality of sets of scheduling request configurations for a second time period between burst transmissions by the UE.

Aspect 28: The method of aspect 27, further comprising: receiving assistance information that indicates a preferred set of scheduling request configurations, or a time period associated with the preferred set of scheduling request configurations, or both, wherein transmitting the first control signaling is based at least in part on the assistance information.

Aspect 29: An apparatus for wireless communication at a UE, comprising memory; a transceiver, and at least one processor coupled with the memory and the transceiver, the at least one processor configured to cause the apparatus to perform a method of any of aspects 1 through 17.

Aspect 30: An apparatus for wireless communication at a UE, comprising at least one means for performing a method of any of aspects 1 through 17.

Aspect 31: A non-transitory computer-readable medium storing code for wireless communication at a UE, the code comprising instructions executable by a processor to perform a method of any of aspects 1 through 17.

Aspect 32: An apparatus for wireless communication at a network entity, comprising memory; a transceiver, and at least one processor coupled with the memory and the transceiver, the at least one processor configured to cause the apparatus to perform a method of any of aspects 18 through 28.

Aspect 33: An apparatus for wireless communication at a network entity, comprising at least one means for performing a method of any of aspects 18 through 28.

Aspect 34: A non-transitory computer-readable medium storing code for wireless communication at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting a scheduling request that indicates information regarding an elapsed time period since information associated with a data packet was obtained at a packet data convergence protocol layer of the UE, or whether the data packet comprises a final packet of a set of data packets, or both; and
receiving scheduling information for communications by the UE, the scheduling information based at least in part on the elapsed time period, or whether the data packet comprises the final packet of the set of data packets, or both.

2. The method of claim 1, wherein transmitting the scheduling request comprises:
transmitting, within the scheduling request, a bit that indicates a request for an uplink grant and whether the elapsed time period is greater than a threshold time period, wherein the bit having a first value indicates that the elapsed time period is greater than the threshold time period and the bit having a second value indicates that the elapsed time period is less than the threshold time period.

3. The method of claim 2, wherein the bit has the first value, and wherein receiving the scheduling information comprises:
receiving the uplink grant, wherein a timing associated with the uplink grant is based at least in part on the bit of the scheduling request having the first value.

4. The method of claim 2, wherein the bit has the second value, the method further comprising:
transmitting a buffer status report after transmitting the scheduling request based at least in part on the elapsed time period being less than the threshold time period, wherein receiving the scheduling information comprises:
receiving the uplink grant in response to the buffer status report, wherein receiving the scheduling information after transmitting the buffer status report is based at least in part on the bit of the scheduling request having the second value.

5. The method of claim 1, further comprising:
receiving control signaling that indicates a plurality of scheduling request configurations each associated with a respective logical channel; and
selecting, based at least in part on the elapsed time period and a threshold time period, a scheduling request configuration from the plurality of scheduling request configurations for transmitting the scheduling request, wherein a first scheduling request configuration of the plurality of scheduling request configurations is for indicating that the elapsed time period is less than the threshold time period and a second scheduling request configuration of the plurality of scheduling request configurations is for indicating that the elapsed time period is greater than or equal to the threshold time period.

6. The method of claim 1, further comprising:
generating the scheduling request to indicate the information regarding the elapsed time period based at least in part on a quality of service associated with a logical channel corresponding to the data packet.

7. The method of claim 1, further comprising:
determining that the elapsed time period is a longest time period of a plurality of elapsed time periods associated with a plurality of data packets for transmission by the UE; and
selecting the data packet from among the plurality of data packets based at least in part on the elapsed time period being the longest time period, wherein the scheduling request indicates the information regarding the elapsed time period for the data packet based at least in part on the data packet being selected from among the plurality of data packets.

8. The method of claim 1, wherein the scheduling request comprises two or more bits configured to indicate the information regarding the elapsed time period, information regarding a portion of a packet delay budget that is remaining for the data packet after the elapsed time period, or both.

9. The method of claim 8, further comprising:
transmitting, via the two or more bits of the scheduling request, an index value that points to a value or range of the elapsed time period from among a set of elapsed time period values or ranges.

10. The method of claim 1, wherein transmitting the scheduling request comprises:
transmitting, within the scheduling request, a bit that indicates a request for an uplink grant and whether the data packet comprises the final packet of the set of data packets, wherein the bit having a first value indicates that the data packet comprises the final packet of the set of data packets and the bit having a second value indicates that the data packet is not the final packet of the set of data packets.

11. The method of claim 1, wherein receiving the scheduling information comprises:
receiving, via the scheduling information, a connected discontinuous reception command based at least in part on the scheduling request indicating that the data packet comprises the final packet of the set of data packets; and
entering a sleep mode based at least in part on the connected discontinuous reception command.

12. The method of claim 1, further comprising:
receiving radio resource control signaling that configures the scheduling request to indicate the information regarding the elapsed time period, or to indicate whether the data packet comprises the final packet of the set of data packets, or both, wherein content of the scheduling request is based at least in part on the radio resource control signaling.

13. The method of claim 1, further comprising:
receiving control signaling that configures a plurality of sets of scheduling request configurations, wherein each set of scheduling request configurations of the plurality of sets is associated with a respective logical channel and one or more respective scheduling request timing parameters, and wherein the one or more respective scheduling request timing parameters comprise a respective buffer status report periodicity, a respective sounding reference signal configuration, a respective channel state information reporting configuration, or any combination thereof.

14. The method of claim 13, further comprising:
receiving second control signaling that activates a first set of scheduling request configurations from among the plurality of sets of scheduling request configurations for a time period associated with a burst transmission by the UE, wherein the set of data packets comprises a first burst transmission; and
receiving third control signaling that activates a second set of scheduling request configurations from among the plurality of sets of scheduling request configurations for a second time period between burst transmissions by the UE.

15. The method of claim 13, wherein the scheduling request is transmitted in accordance with a first set of scheduling request configurations from among the plurality of sets of scheduling request configurations, wherein the set of data packets comprises an uplink burst transmission by the UE, and wherein the data packet comprises the final packet of the uplink burst transmission, the method further comprising:
transmitting, after transmitting the scheduling request and based at least in part on the data packet comprising the final packet of the uplink burst transmission, a second scheduling request in accordance with a second set of scheduling request configurations from among the plurality of sets of scheduling request configurations.

16. The method of claim 13, further comprising:
transmitting assistance information that indicates a preferred set of scheduling request configurations, or a time period associated with the preferred set of scheduling request configurations, or both, wherein receiving the control signaling is based at least in part on the assistance information.

17. A method for wireless communication at a network entity, comprising:
receiving a scheduling request that indicates information regarding an elapsed time period between information associated with a data packet being obtained at a packet data convergence protocol layer of a user equipment (UE) and the scheduling request, or whether the data packet comprises a final packet of a set of data packets, or both;
determining scheduling information for uplink communications by the UE based at least in part on the elapsed time period, or whether the data packet comprises the final packet of the set of data packets, or both; and
transmitting the scheduling information for the uplink communications by the UE.

18. The method of claim 17, wherein receiving the scheduling request comprises:
receiving, within the scheduling request, a bit that indicates a request for an uplink grant and whether the elapsed time period is greater than a threshold time period, wherein the bit having a first value indicates that the elapsed time period is greater than the threshold time period and the bit having a second value indicates that the elapsed time period is less than the threshold time period.

19. The method of claim 18, wherein the bit has the first value, and wherein transmitting the scheduling information comprises:
transmitting the uplink grant for the UE, wherein a timing associated with the uplink grant is based at least in part on the bit of the scheduling request having the first value.

20. The method of claim 18, wherein the bit has the second value, the method further comprising:
receiving a buffer status report after receiving the scheduling request based at least in part on the elapsed time period being less than the threshold time period, wherein determining the scheduling information is based at least in part on the bit having the second value and the buffer status report, and wherein transmitting the scheduling information comprises:
transmitting the uplink grant for the UE, wherein a timing associated with the uplink grant is based at least in part on the bit of the scheduling request having the second value.

21. The method of claim 17, further comprising:
transmitting control signaling that indicates a plurality of scheduling request configurations each associated with a respective logical channel, wherein a first scheduling request configuration of the plurality of scheduling request configurations is for indicating that the elapsed time period is less than a threshold time period and a second scheduling request configuration of the plurality of scheduling request configurations is for indicating that the elapsed time period is greater than or equal to the threshold time period, and wherein the scheduling request is in accordance with one of the first scheduling request configuration or the second scheduling request configuration.

22. The method of claim 17, wherein receiving the scheduling request comprises:
receiving, within the scheduling request, a bit that indicates a request for an uplink grant and whether the data packet comprises the final packet of the set of data packets, wherein the bit having a first value indicates that the data packet comprises the final packet of the set of data packets and the bit having a second value indicates that the data packet is not the final packet of the set of data packets.

23. The method of claim 17, wherein transmitting the scheduling information comprises:
transmitting a connected discontinuous reception command based at least in part on the scheduling request indicating that the data packet comprises the final packet of the set of data packets, wherein the connected discontinuous reception command instructs the UE to enter a sleep mode.

24. The method of claim 17, further comprising:
transmitting radio resource control signaling that configures the scheduling request to indicate the information regarding the elapsed time period, or to indicate whether the data packet comprises the final packet of the set of data packets, or both, wherein content of the scheduling request is based at least in part on the radio resource control signaling.

25. The method of claim 17, further comprising:
transmitting first control signaling that configures a plurality of sets of scheduling request configurations, wherein each set of scheduling request configurations of the plurality of sets is associated with a respective logical channel and one or more scheduling request timing parameters;
transmitting second control signaling that activates a first set of scheduling request configurations from among the plurality of sets of scheduling request configurations for a time period associated with a burst transmission by the UE, wherein the set of data packets comprises a first burst transmission; and
transmitting third control signaling that activates a second set of scheduling request configurations from among the plurality of sets of scheduling request configurations for a second time period between burst transmissions by the UE.

26. An apparatus for wireless communication, comprising:
a transceiver; and
a processing system that includes processor circuitry and memory circuitry that stores code, the processing system configured too:

transmit, via the transceiver, a scheduling request that indicates information regarding an elapsed time period since information associated with a data packet was obtained at a packet data convergence protocol layer of the apparatus, or whether the data packet comprises a final packet of a set of data packets, or both; and
receive, via the transceiver, scheduling information for communications, the scheduling information based at least in part on the elapsed by the apparatus time period, or whether the data packet comprises the final packet of the set of data packets, or both.

27. The apparatus of claim 26, wherein, to transmit the scheduling request, the processing system is configured to:
transmit, via the transceiver and within the scheduling request, a bit that indicates a request for an uplink grant and whether the elapsed time period is greater than a threshold time period, wherein the bit having a first value indicates that the elapsed time period is greater than the threshold time period and the bit having a second value indicates that the elapsed time period is less than the threshold time period.

28. The apparatus of claim 26, wherein, to transmit the scheduling request, the processing system is configured to:
transmit, via the transceiver and within the scheduling request, a bit that indicates a request for an uplink grant and whether the data packet comprises the final packet of the set of data packets, wherein the bit having a first value indicates that the data packet comprises the final packet of the set of data packets and the bit having a second value indicates that the data packet is not the final packet of the set of data packets.

29. The apparatus of claim 26, the processing system further configured to:
receive, via the transceiver, control signaling that configures a plurality of sets of scheduling request configurations, wherein each set of scheduling request configurations of the plurality of sets is associated with a respective logical channel and one or more scheduling request timing parameters.

30. An apparatus for wireless communication, comprising:
a transceiver; and
a processing system that includes processor circuitry and memory circuitry that stores code, the processing system configured to:
receive, via the transceiver, a scheduling request that indicates information regarding an elapsed time period between information associated with a data packet being obtained at a packet data convergence protocol layer of a user equipment (UE) and the scheduling request, or whether the data packet comprises a final packet of a set of data packets, or both;
determine scheduling information for uplink communications by the UE based at least in part on the elapsed time period, or whether the data packet comprises the final packet of the set of data packets, or both; and
transmit, via the transceiver, the scheduling information for the uplink communications by the UE.

* * * * *